United States Patent
Minari et al.

(10) Patent No.: US 10,094,952 B2
(45) Date of Patent: Oct. 9, 2018

(54) ANTI-REFLECTION FILM, METHOD OF PRODUCING THE FILM AND DISPLAY DEVICE

(71) Applicant: Sharp Kabushiki Kaisha, Osaka-shi, Osaka (JP)

(72) Inventors: Chiaki Minari, Osaka (JP); Kiyoshi Minoura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 638 days.

(21) Appl. No.: 14/429,395

(22) PCT Filed: Sep. 13, 2013

(86) PCT No.: PCT/JP2013/074797
§ 371 (c)(1),
(2) Date: Mar. 19, 2015

(87) PCT Pub. No.: WO2014/046021
PCT Pub. Date: Mar. 27, 2014

(65) Prior Publication Data
US 2015/0241604 A1    Aug. 27, 2015

(30) Foreign Application Priority Data
Sep. 20, 2012  (JP) .................................. 2012-207209

(51) Int. Cl.
*G02B 1/11*    (2015.01)
*B29D 11/00*    (2006.01)
(Continued)

(52) U.S. Cl.
CPC ........ *G02B 1/118* (2013.01); *B29D 11/00788* (2013.01); *B32B 27/00* (2013.01);
(Continued)

(58) Field of Classification Search
CPC ..... G02B 1/11; G02B 1/118; B29D 11/00788; G02F 1/133502; Y10T 428/24355; B29K 2105/24; B29K 2105/0002
See application file for complete search history.

(56) References Cited

U.S. PATENT DOCUMENTS

| | | | | |
|---|---|---|---|---|
| 2003/0077437 A1* | 4/2003 | Nakamura | ............. | B82Y 20/00 428/327 |
| 2005/0008863 A1* | 1/2005 | Mimura | .................. | G02B 1/11 428/409 |

(Continued)

FOREIGN PATENT DOCUMENTS

| | | | |
|---|---|---|---|
| JP | 2004-029672 A | | 1/2004 |
| JP | 2008209867 A | | 9/2008 |

(Continued)

OTHER PUBLICATIONS

EPO translation of JP-2011008296-A, retrieved Nov. 14, 2017 (Year: 2017).*

(Continued)

*Primary Examiner* — Frank J Vineis
*Assistant Examiner* — Michael Zhang
(74) *Attorney, Agent, or Firm* — Harness, Dickey & Pierce, P.L.C.

(57) ABSTRACT

An example embodiment of the present invention provides an anti-reflection film capable of providing low reflectability and designability, a method of producing the film, and a display device. Another example embodiment of the present invention relates to an anti-reflection film including a substrate and a resin layer on the substrate, the resin layer containing a plurality of cavities, the resin layer and the substrate having different refractive indexes from each other, the resin coat including a base portion and a plurality of protrusions on the base portion, the plurality of protrusions being integrally formed with the base portion, the base portion having a thickness that varies at least in one direction in a region.

6 Claims, 21 Drawing Sheets

(51) Int. Cl.
    *G02B 1/118*    (2015.01)
    *B32B 27/00*    (2006.01)
    *G02F 1/1335*    (2006.01)
    *B29K 105/00*    (2006.01)
    *B29K 105/24*    (2006.01)

(52) U.S. Cl.
    CPC .......... *G02B 1/11* (2013.01); *G02F 1/133502* (2013.01); *B29K 2105/0002* (2013.01); *B29K 2105/24* (2013.01); *G02F 2201/38* (2013.01); *Y10T 428/24355* (2015.01)

(56) References Cited

U.S. PATENT DOCUMENTS

| | | | |
|---|---|---|---|
| 2011/0003121 A1* | 1/2011 | Tsuda | G02B 1/118 428/156 |
| 2011/0199561 A1 | 8/2011 | Hasegawa et al. | |
| 2011/0317270 A1* | 12/2011 | Minoura | G02B 1/118 359/599 |
| 2013/0004718 A1 | 1/2013 | Takihara et al. | |

FOREIGN PATENT DOCUMENTS

| | | | |
|---|---|---|---|
| JP | 2009-122371 A | | 6/2009 |
| JP | 2011-008296 A | | 1/2011 |
| JP | 2011008296 A | * | 1/2011 |
| JP | 2011-138152 A | | 7/2011 |
| JP | 2011-168003 A | | 9/2011 |
| JP | 2012048239 A | | 3/2012 |
| JP | 2012128353 A | | 7/2012 |
| WO | WO-2009/144970 A1 | | 12/2009 |
| WO | WO-2011115162 | | 5/2011 |
| WO | WO-12124693 A1 | | 9/2012 |

OTHER PUBLICATIONS

International Search Report PCT/ISA/210 for International Application No. PCT/JP2013/074797 dated Nov. 27, 2013.

* cited by examiner

Fixed-end reflection   Free-end reflection

Low concentration   High concentration   18

About 5 mm

Comparative Example 1

Example 1

Interface is unrecognizable.

Interface is unrecognizable.

Resin layer

Acrylic film

Low concentration   High concentration   318

Low concentration      High concentration

ANTI-REFLECTION FILM, METHOD OF PRODUCING THE FILM AND DISPLAY DEVICE

CROSS REFERENCE TO RELATED APPLICATIONS

This is a national phase application of PCT/JP2013/074797 filed Sep. 13, 2013, which is an International Application claiming priority to JP 2012-207209 filed on Sep. 20, 2012, the entire contents of each of which are hereby incorporated by reference.

TECHNICAL FIELD

The present invention relates to an anti-reflection film, a method of producing the film, and a display device. Specifically, the present invention relates to an anti-reflection film suitable for a display device, a method of producing the film, and a display device including the film.

BACKGROUND ART

Films with reflection-preventing function (hereinafter, also referred to as anti-reflection films) and substrates with reflection-preventing function in diversified systems have been reported in many applications ranging from various display devices to optical components and building-products.

At the same time, displays for outdoor use, such as so-called mobile displays (e.g., mobile phones, smart phones, tablet PCs) and digital signages, have been rapidly spread. Thus, the aforementioned anti-reflection films are requested to have higher performances and higher values.

Reflection-preventing performance obtainable by moth-eye technology, among diversified anti-reflection technologies, is far greater than performances obtainable by other technologies. Moth-eye technology enables elimination of reflection interfaces by a structure with protrusions of the order of nanometers. Moth-eye technology has thus attracted much attention these days.

For example, a liquid crystal display device is disclosed (for example, Patent Literature 1) which includes a liquid crystal cell, a first polarizing element disposed at a viewing surface side of the liquid crystal cell, a second polarizing element disposed at a viewing surface side of the first polarizing element, and a reflection-preventing layer with a moth-eye structure disposed at a viewing surface side of the second polarizing element.

CITATION LIST

Patent Literature

Patent Literature 1: JP 2011-138152 A

SUMMARY OF INVENTION

Technical Problem

Although many reports on moth-eye technology have already been published, the majority of the reports are about the reflection-preventing function, or super water repellency or superhydrophilicity. No reports describe other added values, in particular, designability.

Paragraph [0062] of Patent Literature 1 describes that Newton rings can be prevented from occurring by treating the surface of a polarizer provided on a rear side. Thus, Newton rings are considered to degrade display quality in Patent Literature 1.

The present invention has been created in view of the above current state of the art. The present invention aims to provide an anti-reflection film capable of providing low reflectability and designability, a method of producing the film, and a display device.

Solution to Problem

One aspect of the present invention may be an anti-reflection film that includes a substrate and a resin layer on the substrate.

The resin layer may contain a plurality of cavities.

The resin layer and the substrate may have different refractive indexes from each other.

The resin coat may include a base portion and a plurality of protrusions on the base portion.

The plurality of protrusions may be integrally formed with the base portion.

The base portion may have a thickness that varies at least in one direction in a region.

The anti-reflection film may further include a body that is different from the resin layer and the substrate.

The body may be in contact with the resin layer.

The thickness may be greater at a site farther from the body within a region including the body.

The body may include foreign matter.

The body may include a structure.

The substrate may have at least one of a concave portion and a convex portion on its surface.

Another aspect of the present invention may be a display device that includes the anti-reflection film.

Still another aspect of the present invention may be a method of producing the anti-reflection film.

The method may include preparing a substrate, preparing a solution containing a curable resin composition and a solvent, preparing a plate with a plurality of pores, applying the solution to at least one of the substrate and the plate, pressing the plate onto the substrate to dispose the applied solution between the plate and the substrate, curing the curable resin composition while the solution is disposed between the plate and the substrate, separating the plate from a laminate of the substrate and a cured product of the curable resin composition, and volatilizing the solvent after the curable resin composition is cured.

The solution may be in contact with a body other than the plate, the solution, and the substrate during the pressing of the plate.

The body may include foreign matter.

The body may include a structure.

At least one of the substrate and the plate may have at least one of a concave portion and a convex portion on its surface.

Advantageous Effects of Invention

The present invention can provide an anti-reflection film capable of providing low reflectability and designability, and a method of producing the film. The present invention can also provide a display device that can exert low reflectability and designability.

DESCRIPTION OF EMBODIMENTS

Figure 1:
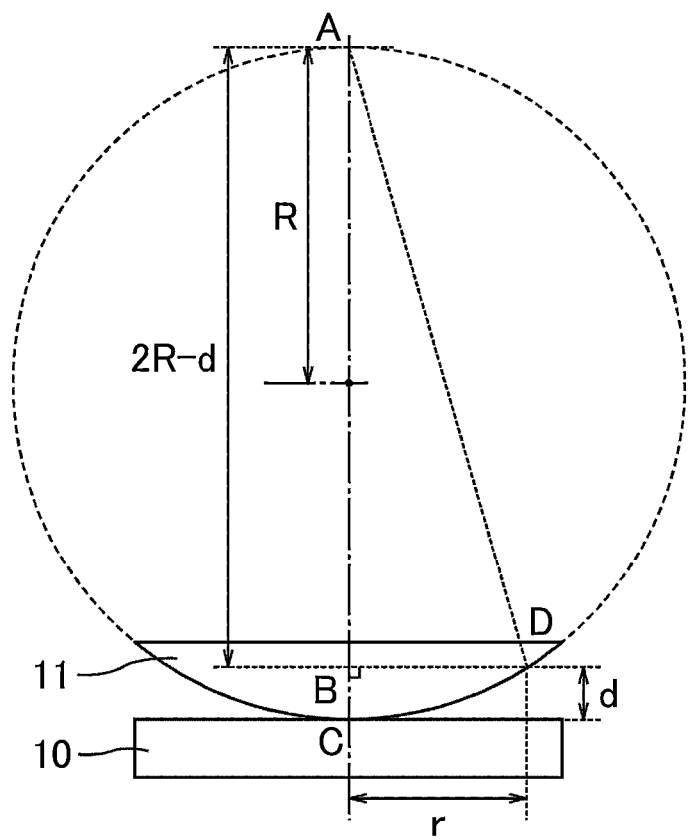
FIG. 1 is a schematic cross-sectional view of a substrate and a convex lens.

The interference pattern herein includes all patterns generated by light interference. It includes so-called Newton rings, though it is not limited to a cyclic pattern.

The foreign matter refers to a kind of bodies which are other than the plate, solution-containing resin, resin layer, and substrate and is one not specially prepared for producing an anti-reflection film.

The structure refers to a kind of bodies which are other than the plate, solution-containing resin, resin layer, and substrate and is one (formation) specially formed for producing an anti-reflection film.

The visible light refers to light having a wavelength of 380 to 780 nm. A wavelength of not longer than the visible light wavelength specifically means a wavelength of not longer than 380 nm.

The present invention will be described in more detail referring to the drawings in the following embodiments, but is not limited to these embodiments.

The following embodiment will discuss the low reflectability obtainable by moth-eye technology, and the designability achieved by the low reflectability. The embodiment will mainly discuss anti-reflection films capable of simultaneously providing low reflectability and designability.

Patent Literature 1 discloses a technique for preventing generation of Newton rings by a surface treatment (for example, formation of a moth-eye structure). However, it does not disclose any technique including active generation of Newton rings. In contrast, the following embodiment provides, for example, a technique which enables generation of an interference pattern on a deep dark black display due to a moth-eye structure, so that the display can obtain designability.

Embodiment 1

Figure 2:
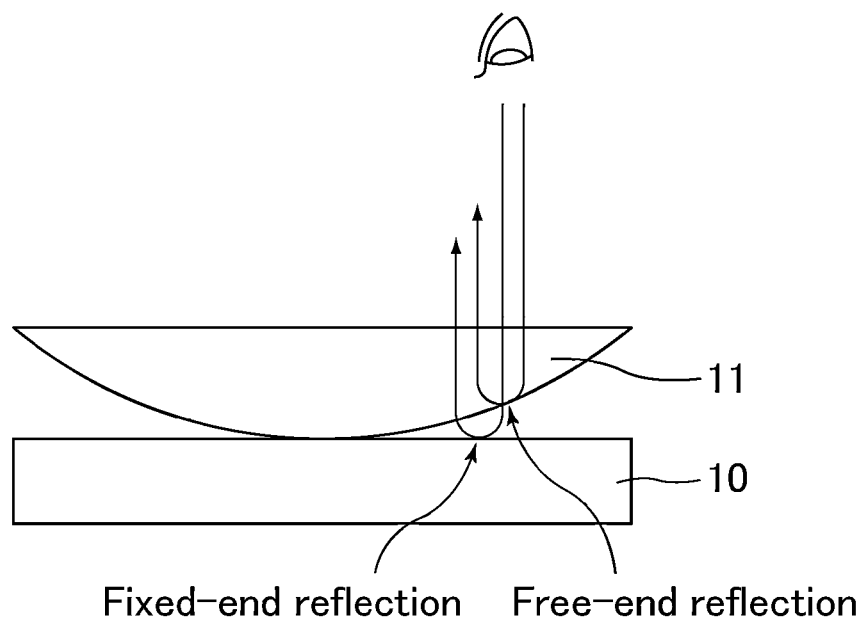
FIG. 2 is a schematic cross-sectional view of a substrate and a convex lens.
Figure 3:
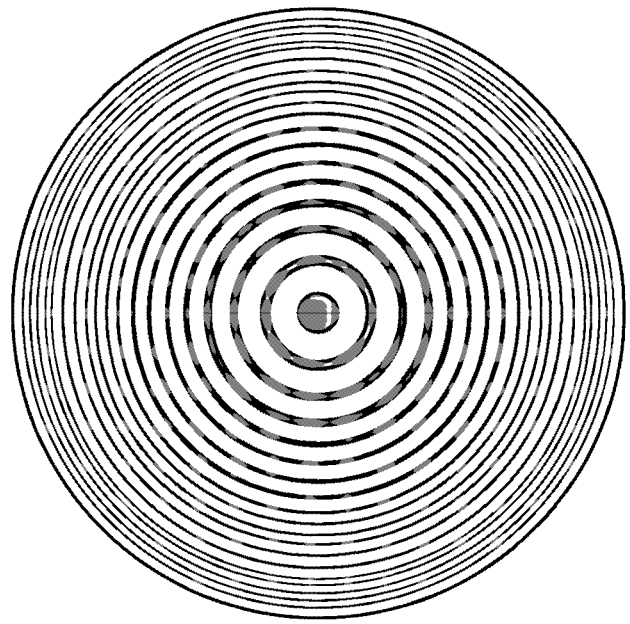
FIG. 3 is a schematic view illustrating a state where Newton rings appear.

First, the mechanism of Newton ring generation will be described. FIG. 1 and FIG. 2 each are a schematic cross-sectional view of a substrate and a convex lens. FIG. 3 is a schematic view illustrating a state where Newton rings appear.

It is well known that, as shown in FIG. 1, Newton rings are observed when a very flat substrate 10, which is attached to a convex surface of a convex lens 11, is observed from the convex lens 11 side. As shown in FIG. 2, light reflected on the convex surface interferes with light reflected on the surface of the substrate 10 so that they are intensified or eliminated by each other at certain points. As shown in FIG. 3, when monochromatic light is incident to these members, ring-shaped light and dark lines (Newton rings) appear. In the case of white light incident, these rings appear in rainbow colors due to the prismatic effect.

Provided that the distance between the convex surface and the surface of the substrate 10 is d; the distance from the center of the convex lens 11 is r; the radius of curvature of the convex lens 11 is R; and the wavelength of light is λ as shown in FIG. 1, then Newton rings appear when d<<r and d<<R. Light lines appear at positions satisfying the formula: $r^2/R=(m+½)\lambda$, whereas dark lines appear at positions satisfying the formula: $r^2/R=m\lambda$. In the formulas, m represents an integer.

Figure 4:
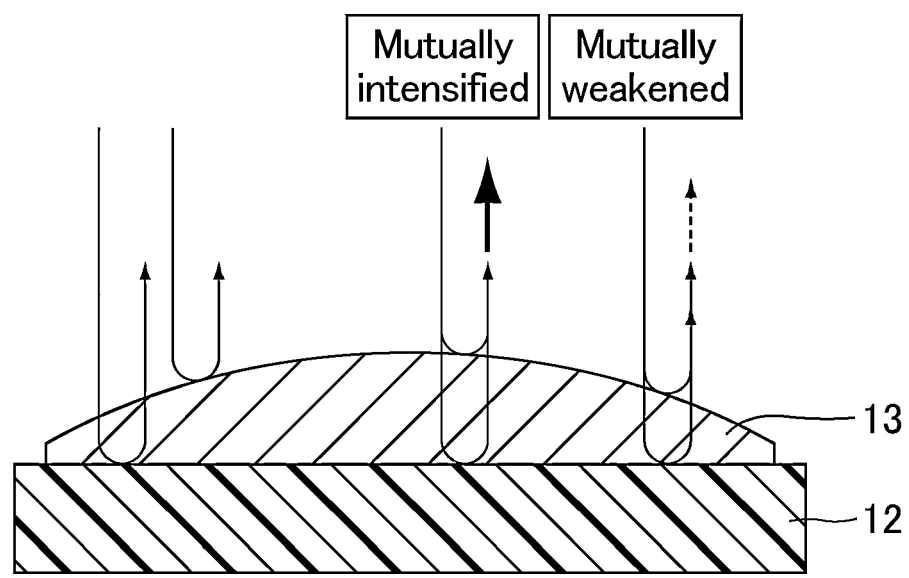
FIG. 4 is a schematic cross-sectional view of a substrate and a resin layer.

FIG. 4 is a schematic cross-sectional view of a substrate and a resin layer.

As shown in FIG. 4, in the case where a resin layer 13 having a refractive index of n1 is formed on a substrate 12 having a refractive index of n2 (≠n1), light reflection occurs at an interface between air and the resin layer 13 and an interface between the resin layer 13 and the substrate 12. If the resin layer 13 does not have a sufficient thickness relative to the wavelength of light, and also the thickness varies in substantially the same range as the wavelength of light, synthetic waves of the light reflected on these interfaces change according to the thickness of the resin layer 13. Thus, an interference pattern (Newton rings) is observed. Specifically, provided that the thickness of the resin layer 13 is d, and the wavelength of light is λ, then light lines appear when the following formula (1) is satisfied, or dark lines appear when the following formula (2) is satisfied. In the formulas, m represents an integer.

$$2n1\times d=(2m+1)\lambda/2 \quad (1)$$

$$2n1\times d=m\lambda \quad (2)$$

The following will discuss a method of producing an anti-reflection film of the present embodiment and the mechanism thereof.

First, a substrate, a solvent-containing resin (solution), and a plate (mold) are prepared.

The substrate is a transparent member which supports a resin layer described below. Specific examples include transparent films such as triacetylcellulose (TAC) films and acrylic films. A surface-treating layer such as a hard coat (HC) layer may be formed on the surface of the transparent film. The HC layer is provided to enhance the properties including adhesiveness and hardness. The HC layer is usually formed by applying a hard coat material to the surface of the transparent film and exposing the applied coat to light.

The solvent-containing resin is a composition (solution) prepared by adding a solvent (medium) to a resin composition. Since the solvent-containing resin contains a solvent component, it has a lower viscosity, better leveling property, and excellent coating property as compared to the resin composition itself. Thus, the solvent-containing resin has advantageous properties for processing. Moreover, if the substrate poorly adheres to a resin layer described below, addition of a solvent allows the solvent component to permeate the substrate, which may enhance the adhesion between them. Further, if the resin material (for example, an initiator or a stabilizer) is in a solid form such as granules, powders, and pellets, advantageously a desired resin composition can be easily prepared.

The solvent may be in any kind as long as it is soluble in the resin composition. Examples include toluene, methyl ethyl ketone (MEK), and methyl isobutyl ketone (MIBK). The solvent may be chosen in consideration of the leveling property, boiling point, or safety such as process compatibility. For enhancing the adhesiveness, preferably the solvent is moderately soluble into the substrate (especially a portion forming the surface). A solvent with excessive solubility may fail to achieve sufficient visibility of an interference pattern.

The resin composition is a composition (solid component) containing components, such as a monomer, an oligomer, a photo-polymerization initiator, various additives (for example, stabilizers, fillers), or the like, and has photocurability (preferably ultraviolet rays curability). The kind of each component is not particularly limited and may be appropriately selected. The resin composition preferably has filling properties (capability of being introduced into pores of a plate). A cured product of the resin composition preferably has releasability (capability of being separated from a plate). Specific examples of the resin composition include acrylate-based resin compositions and methacrylate-based resin compositions.

The concentration of the solvent component in the solvent-containing resin may be appropriately set; for example, it may be approximately in a range of 10% by weight to 80% by weight. The concentration of the solvent component is calculated from the following formula:

(Weight of solvent component)/{(Weight of resin composition components)+(Weight of solvent component)}×100.

The plate has an inverted shape of a moth-eye structure (shape) on its surface. The plate may be prepared by any method, preferably by anodic oxidation of aluminum.

Specifically, the plate is prepared as follows. First, a substrate for a plate is prepared. Examples of the kind of the substrate include flat plates and seamless rolls. The flat plate may be a glass plate. The seamless roll may be an aluminum pipe or an electrodeposited sleeve. The electrodeposited sleeve is prepared by forming an insulation coat on a nickel roll by electrodeposition.

In the case of using a glass plate or an electrodeposited sleeve, an aluminum film having a thickness of approximately 0.5 to 2 µm is formed by sputtering on a surface of a glass plate or an electrodeposited sleeve.

Next, the substrate is repeatedly subjected to anodic oxidation and etching. The substrate undergoes anodic oxidation several times (for example, five times) in a solution such as oxalic acid, and undergoes etching several times (for example, four times) in a solution such as phosphoric acid. The substrate is washed with water between the anodic oxidation and the etching to avoid mixing of the solutions. Accordingly, an anodized layer with a large number of fine pores (convex portions) is formed on the surface of the substrate.

Then, a mold release agent is applied to the anodized layer. Examples of the mold release agent include OPTOOL DSX produced by Daikin Industries Ltd. The mold release agent is air dried by allowing it to stand for one day to be fixed. After the fixing, hydrofluoroether (HFE) is poured over the substrate for rinsing.

A plate is completed through the above process. The surface of the plate has undergone a releasing treatment as described above, and is thus hydrophobic.

The plate may be produced not by anodic oxidation of aluminum but by interference exposure of a photoresist.

Figure 5:
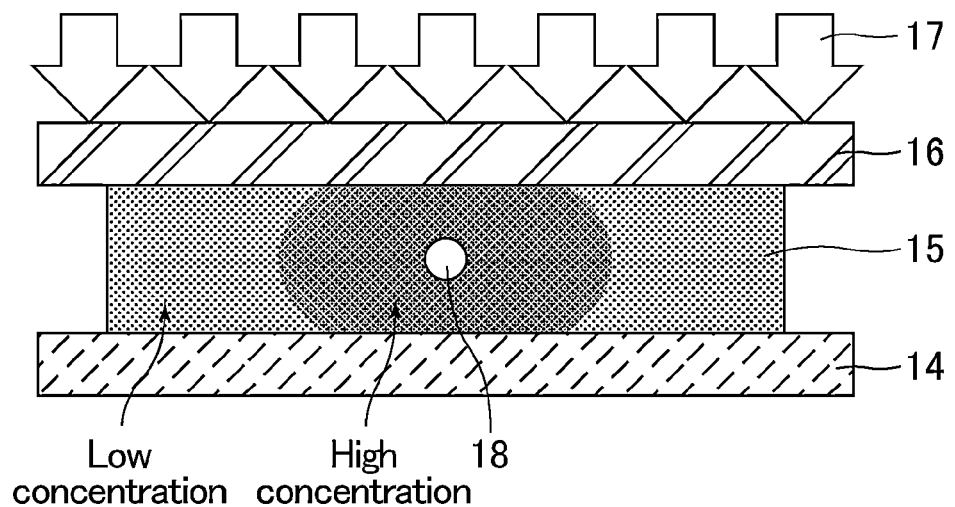
FIG. 5 is a schematic cross-sectional view of members in a process (exposure to light) of production of an anti-reflection film of Embodiment 1.

FIG. 5 is a schematic cross-sectional view of members in a process (exposure to light) of production of an anti-reflection film of Embodiment 1.

In the case of using a glass plate, a solvent-containing resin 15 is thinly applied to at least one of a plate 14 and a substrate 16 using a die coater. Then, the substrate 16 is pressed to the plate 14 with the solvent-containing resin 15 interposed therebetween. The solvent-containing resin 15 is irradiated with light (preferably ultraviolet rays) from the substrate 16 side while the plate 14 is closely adhered to the solvent-containing resin 15, and the substrate 16 is closely adhered to the solvent-containing resin 15. The light irradiation allows monomers and/or oligomers to be polymerized so that the resin composition is cured, thereby forming a resin layer 19, which is a cured product of the resin composition. Next, a laminate of the resin layer 19 and the substrate 16 is separated from the plate 14. Through the above process, cone shapes are transformed on the surface of the resin layer 19 so that cone-shaped protrusions are formed.

In the case of using an aluminum pipe or an electrodeposited sleeve, the shape may be transformed by a roll-to-roll technology.

In either of the cases, foreign matter 18, which is a kind of bodies other than the plate 14, solution-containing resin 15, and substrate 16, contacts the solution-containing resin 15 before the exposure to light. The foreign matter 18 may be present on the plate 14 or the substrate 16 before it contacts the solution-containing resin 15. Alternatively, the foreign matter 18 in the air may be mixed in the solvent-containing resin 15 before the substrate 16 is pressed to the plate 14. Further, the foreign matter 18 may continue to stay on the plate 14 or the substrate 16, or may be incorporated into the solvent-containing resin 15. Since the foreign matter 18 is different from the plate 14, usually the surface condition (for example, surface energy) of the plate 14 is considered different from that of the foreign matter 18. The plate 14 has a hydrophobic surface as described above, whereas the foreign matter 18 presumably has a different level of affinity to water from the surface of the plate 14. The foreign matter 18 may be hydrophilic. Strictly speaking, the concentration of the solvent component is not uniform in the solvent-containing resin 15. Thus, a portion with a higher concentration of the solvent component in the solvent-containing resin 15, that is, a portion containing a larger amount of the solvent component, is presumably attracted by the foreign matter 18. Alternatively, the solvent component is presumably attracted by the foreign matter 18. This results in a greater position-dependent variation in the concentration of the solvent component.

Figure 6:
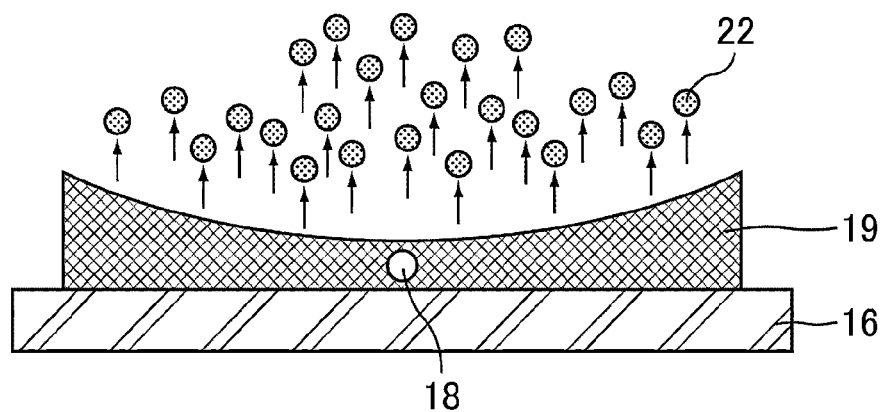
FIG. 6 is a schematic cross-sectional view of members in a process (drying) of production of an anti-reflection film of Embodiment 1.

FIG. 6 is a schematic cross-sectional view of members in a process (drying) of production of an anti-reflection film of Embodiment 1.

As shown in FIG. 6, a solvent component 22 in the solvent-containing resin 15 volatilizes during the exposure to light and the separation from the plate. As a result, a transparent resin layer 19 is formed. The resin layer 19 has a non-uniform thickness presumably for the following reason. Since the concentration of the solvent component is not uniform as described above, the amount of the volatilized solvent component presumably varies depending on the position. Presumably, the resin layer 19 is thinner at a region where the amount of the volatilized solvent component is larger, whereas it is thicker at a region where the amount of the volatilized solvent component is smaller. Thus, the resin layer 19 presumably has a thickness distribution which corresponds to the concentration distribution of the solvent component.

The solvent component 22 may be dried by any method, and may be air-dried or heat-dried. For effectively preventing the solvent component 22 from remaining in a product, heat drying is preferable. The condition for the heat drying is not particularly limited, and may be appropriately set depending on the boiling point of the solvent used, or the heat resistance of the substrate 16, resin layer 19, or the like. For example, hot air at a temperature of 40° C. to 120° C. may be brown against the resin layer 19. Heat may be generated during the exposure to light due to light absorption of the resin composition. Also, the solvent component 22 may be slightly volatilized by the heat during the exposure to light. Most of the solvent component 22 is considered to volatilize usually after the separation from the plate.

The foreign matter 18 is not particularly limited as long as it causes the resin layer 19 to have a non-uniform thickness. Preferably, the foreign matter 18 can locally gather the solvent component and has a higher affinity to the solvent than the plate 14 and substrate 16. The foreign matter 18 is not limited to particles. Specific examples include fine particles, fibers, dusts, and stains.

The size of the foreign matter 18 is not particularly limited. Considering the size of an interference pattern, the size of the foreign matter 18 in a plan view of the anti-reflection film is preferably 500 nm or larger but 10 mm or smaller, more preferably 5 µm or larger but 1 mm or smaller. Among the foreign matter 18, a stain is very thin and may have a thickness of approximately 1 nm. The resin layer 19 usually has a thickness of 100 µm or less. Thus, the size of the foreign matter 18 in a thickness direction of the anti-reflection film is usually 1 nm or larger but 100 µm or smaller. The size of the foreign matter 18 may be larger than the thickness of the resin layer 19. The size of the foreign matter 18 in a thickness direction of the anti-reflection film may be 10 mm or smaller.

A method of generating a stain as the foreign matter 18 will be described below. Mist always floats in the atmosphere. Acidic mist flies around a bath in which an acidic solution for anodic oxidation of aluminum is placed. Adhesion of such mist to at least one of the plate 14 and the substrate 16 can form a stain which is, for example, a thin film of the adhered mist. The difference in the surface energy between the stain and other parts can generate an interference pattern. The surface of at least one of the plate 14 and the substrate 16 may undergo a certain mist treatment, which enables positive controlling of an interference pattern. The stain may be a spot resulting from drying of an adhered water droplet.

Even if no foreign matter 18 is present, the concentration of the solvent component in the solvent-containing resin 15 is originally not uniform. Such a non-uniform concentration causes small partial variations in the thickness of a coat of the solvent-containing resin 15 and the thickness of the resin layer 19. Thus, an interference pattern can be caused without the foreign matter 18.

A concave portion, such as a pinhole, may be formed in the surface of at least one of the plate 14 and the substrate 16. In this case as well, an interference pattern can be caused. A plane with a three-dimensional structure has a larger surface area than the plane without the structure, regardless of whether the structure projects or recesses from the surrounding plane area. This may be the cause of non-uniform concentration of the solvent component.

Figure 7:
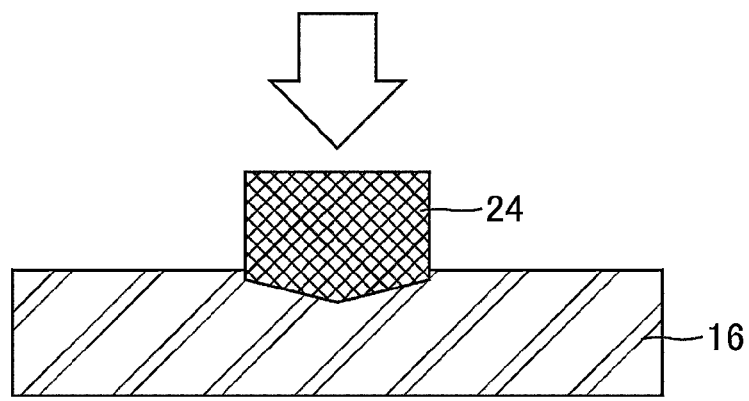
FIG. 7 is a schematic cross-sectional view of a substrate in a process of production of an anti-reflection film of Embodiment 1.
Figure 8:
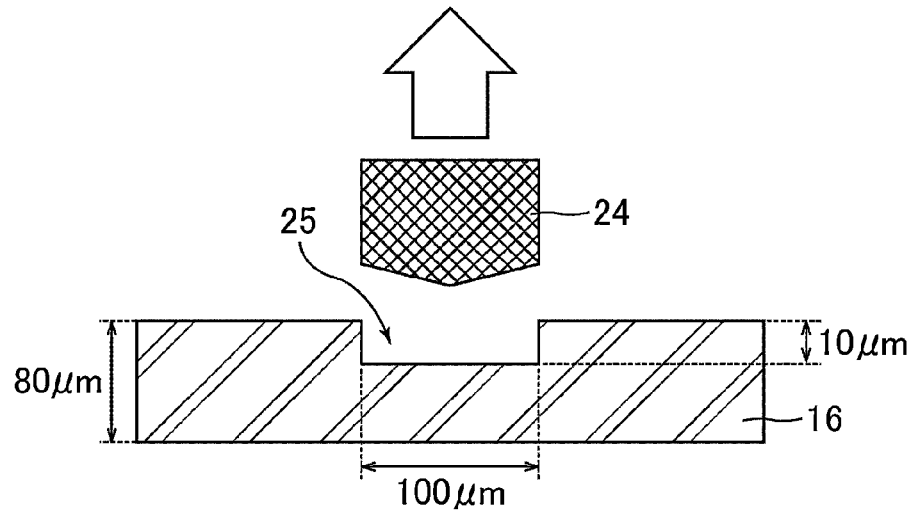
FIG. 8 is a schematic cross-sectional view of a substrate in a process of production of an anti-reflection film of Embodiment 1.
Figure 9:
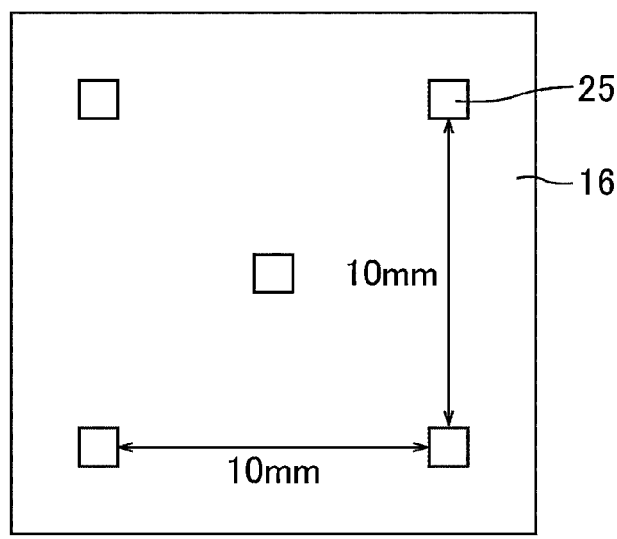
FIG. 9 is a schematic plan view of a substrate included in an anti-reflection film of Embodiment 1.

FIG. 7 and FIG. 8 each are a schematic cross-sectional view of a substrate in a process of production of an anti-reflection film of Embodiment 1. FIG. 9 is a schematic plan view of a substrate included in an anti-reflection film of Embodiment 1.

A pinhole 25 may be formed as a concave portion in the surface of the substrate 16 as shown in FIG. 8 and FIG. 9 by pressing a diamond cutter 24 into the substrate 16 as shown in FIG. 7 and separating the diamond cutter 24 from the substrate 16 as shown in FIG. 8. Irregularities (concave portion and convex portion) may be formed on the surface of at least one of the plate 14 and the substrate 16. Irregularities (concave portion and convex portion) can be formed by, for example, a sandblasting technology for forming irregularities. Formation of a concave portion and/or a convex portion enables easy generation of an interference pattern. Meanwhile, the thickness of the substrate 16 and the size and position of the pinhole 25 shown in FIG. 8 and FIG. 9 are mere examples and are not limited thereto.

The size of the convex portion and/or the concave portion formed on the surface of at least one of the plate 14 and the substrate 16 is not particularly limited. Considering the size of the interference pattern, the size of the concave portion, such as a pinhole, in a plan view of the anti-reflection film is preferably 500 nm or larger but 10 mm or smaller, more preferably 5 μm or larger but 1 mm or smaller. Considering the height of each protrusion of the moth-eye structure and the aforementioned size of the concave portion in a plan view, the size of the concave portion in a thickness direction of the anti-reflection film, that is, the depth of the concave portion, is preferably 50 nm or larger but 10 mm or smaller, more preferably 1000 nm or larger but 1 mm or smaller. The irregularities (concave portion and convex portion) may be in approximately a size that can be formed by, for example, a common sandblasting technique.

In the present embodiment, the resin composition is cured while it contains the solvent component. Thus, a large number of fine cavities appear in the resin layer 19 upon volatilization of the solvent component, thereby forming a porous structure. The entire resin layer 19 containing the cavities has a lower refractive index than a resin layer formed by curing only the resin composition, that is, a resin layer without cavities, due to air in the cavities. The size of the cavities and the proportion of the cavities in the resin layer 19 are not particularly limited. They vary according to the concentration of the solvent component.

The resin layer 19 has a different refractive index from that of the substrate 16, in particular, a portion of the substrate 16 contacting the resin layer 19. The difference in their refractive indexes is preferably approximately 0.001 to 0.2, more preferably approximately 0.01 to 0.1. The difference of 0.001 or more can cause interference phenomenon. The difference exceeding 0.2 can cause interference but may fail to produce enough reflection-preventing effects derived from the moth-eye structure. For example, about 0.5% of reflection occurs on an interface between a member with a refractive index of 1.3 and a member with a refractive index of 1.5, and about 0.4% of reflection occurs on an interface between a member with a refractive index of 1.5 and a member with a refractive index of 1.7. The magnitude relation between the refractive indexes is not particularly limited, and does not significantly affect generation of an interference pattern, regardless of which is larger. However, reversal of the magnitude relation changes the phase change upon reflection of light, and thereby the light regions and dark regions of the interference pattern are reversed.

The refractive indexes of the resin layer 19 and the substrate 16 are not particularly limited and may be set appropriately. The substrate 16, in particular, a portion of the substrate 16 contacting the resin layer 19, has a refractive index of preferably 1.45 to 1.65, more preferably 1.48 to 1.62. Thus, the substrate 16 can be produced from common materials. The resin layer 19 preferably has a refractive index that is within ±0.2 of the refractive index of the substrate 16. It preferably has a refractive index of 1.25 to 1.85, more preferably 1.35 to 1.75. For easy formation of a transparent resin layer 19 from a common photocurable resin composition, the resin layer 19 preferably has a refractive index of 1.25 to 1.65.

Through the above process, an anti-reflection film of the present embodiment is produced. The non-uniform thickness of the resin layer 19 and the slight difference between the refractive index of the substrate 16 and that of the resin layer 19 allow the anti-reflection film of the present embodiment to be an anti-reflection member capable of generating an interference pattern, that is, a member having both of reflection-preventing performance and designability.

Figure 10:
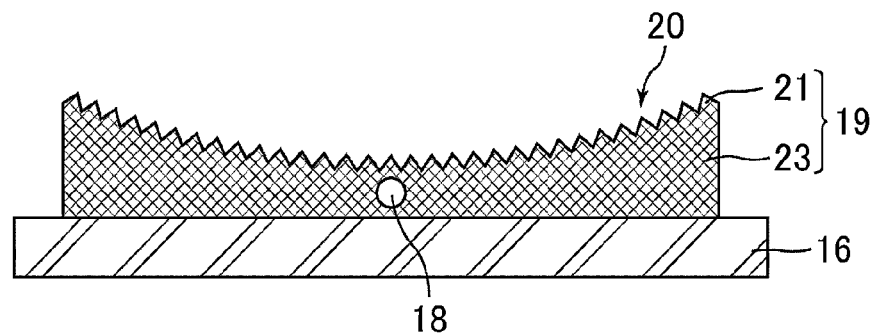
FIG. 10 is a schematic cross-sectional view of an anti-reflection film of Embodiment 1.

The structure of the resin layer 19 will be further described below. FIG. 10 is a schematic cross-sectional view of an anti-reflection film of Embodiment 1.

The resin layer 19 includes a base portion 23 on the substrate 16 and a large number of protrusions (convex portions) on the base portion 23 as shown in FIG. 10. The base portion 23 is integrally formed with the protrusions 21, with the sharp protrusions 21 being disposed on the base portion 23 which is gently curving. Thus, the base portion 23 has a thickness that varies at least in one direction (preferably in two directions or more) in a certain region (any region). In other words, the base portion 23 has a varying thickness in at least one cross section (preferably, two or more cross sections which intersect one another). Such a structure enables generation of an interference pattern. The region where the base portion 23 has a varying thickness may be of any size which allows visual observation of an interference pattern. The thickness of the base portion 23 may vary throughout the film.

In the case where the foreign matter 18 is in contact with the resin layer 19, the thickness of the base portion 23 is greater at a site farther from the foreign matter 18 within a region (any region) including the foreign matter 18. Such a structure enables easy generation of an interference pattern. In this case, the foreign matter 18 is usually located at about the center of the region. The size of the region is not particularly limited. If an interference pattern is generated with its center being about at the foreign matter 18, the thickness of the base portion 23 may gradually increase from the foreign matter 18 within a region of about 1 cm from the foreign matter 18.

A moth-eye structure 20 including the protrusions 21 is formed on the surface side, i.e., the face contacting an air layer, of the resin layer 19.

The pitches of the protrusions 21 are not longer than the visible light wavelength. The protrusions 21 are each tapered toward the apex. A horizontal cross section of each protrusion 21 closer to the apex has a smaller area. The horizontal cross section of each protrusion 21 herein refers to a cross section of each protrusion 21 parallel with a hypothetical plane which divides the protrusions 21 and the base portion 23 (hereinafter, also referred to as hypothetical plane).

Figure 11:
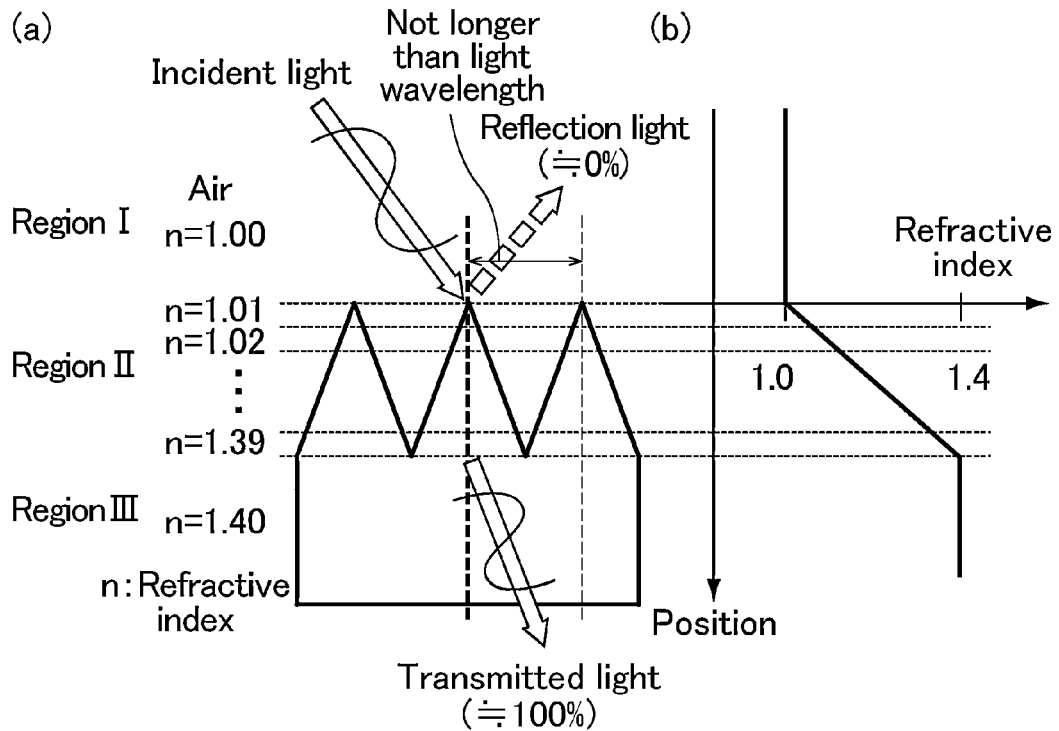
FIGS. 11(a) and 11(b) are explanatory drawings illustrating reflection-preventing performance of a moth-eye structure in an anti-reflection film of Embodiment 1.

The moth-eye structure 20 can effectively reduce light reflection at an interface between an air layer and the resin layer 19. The principle will be described below. FIGS. 11(a) and 11(b) are explanatory drawings illustrating reflection-preventing performance of a moth-eye structure in an anti-reflection film of Embodiment 1.

When the refractive index suddenly changes within a distance shorter than the wavelength of incident light at an interface between two substances in the normal direction, the light reflects at the interface. Conversely, light reflection can be prevented by reducing the change in the refractive index at the interface. The resin layer 19 has a refractive index of, for example, approximately 1.4, which is greatly different from the refractive index (=1.0) of air. The pitches of the protrusions 21 and the heights of the protrusions 21 are in the nanometer scale, and the protrusions 21 are tightly spread over the surface of the resin layer 19 like an eye of a moth. Thus, as shown in FIG. 11(a) and FIG. 11(b), the refractive index at an interface between the air layer and the resin layer 19 continuously changes (see Region II in FIG. 11(a) and FIG. 11(b)). In such a structure, incident light does not recognize the interface clearly and thus mostly transmits through the interface without reflecting on the interface.

The anti-reflection film having an moth-eye structure of the present embodiment can exert greater reflection-preventing performance than common low reflection (LR) films and anti-reflection (AR) films, and can also achieve a super low reflectance (for example, minimum value of 0.05%) in entire visible light wavelength range. LR films and AR films both function as anti-reflection members. AR films have a lower reflectance than LR films.

Each protrusion 21 has a height of preferably 50 nm or more but 1000 nm or less, more preferably 100 nm or more but 500 nm or less. All the protrusions 21 may or may not have the same height.

The pitches of the protrusions 21 are not limited as long as they are not longer than the visible light wavelength. The pitches each are preferably 50 nm or longer but 380 nm or shorter, more preferably 80 nm or longer but 250 nm or shorter. All the pitches between the protrusions 21 may be the same, that is, the protrusions 21 are arranged at a fixed interval. Alternatively, the pitches between the protrusions 21 may be different from one another, that is, the protrusions 21 may not be randomly arranged.

The protrusions 21 may have a variety of shapes. All the protrusions 21 may or may not have the same shape.

Examples of the horizontal cross sectional shape of the protrusions 21 include round shape, elliptical shape, triangular shape, quadlangular shape, and other polygonal shapes. Each protrusion 21 entirely has the same horizontal cross sectional shape, or has different horizontal cross sectional shape according to the position of the cross section.

In view of employing a below-mentioned highly productive production method using a plate, preferably each protrusion 21 entirely has a round horizontal cross section.

Examples of an orthogonal cross sectional shape of each protrusion 21 include a sine-wave-like shape, triangular shape, and trapezoidal shape. An orthogonal cross section of each protrusion 21 herein refers to a cross-section of each protrusion 21 perpendicular to the hypothetical plane. The apex of each protrusion 21 may be flat. Adjacent protrusions 21 may have a flat area between them. For enhancing the reflection-preventing performance in these cases, the flat area is preferably as small as possible. From a similar point of view, the moth-eye structure 20 preferably includes no flat area.

Figure 12:
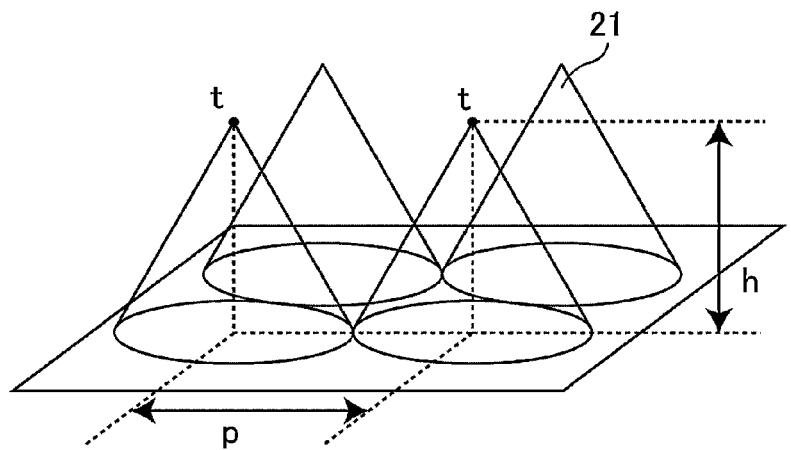
FIG. 12 is a perspective schematic view of protrusions of a moth-eye structure in an anti-reflection film of Embodiment 1.
Figure 13:
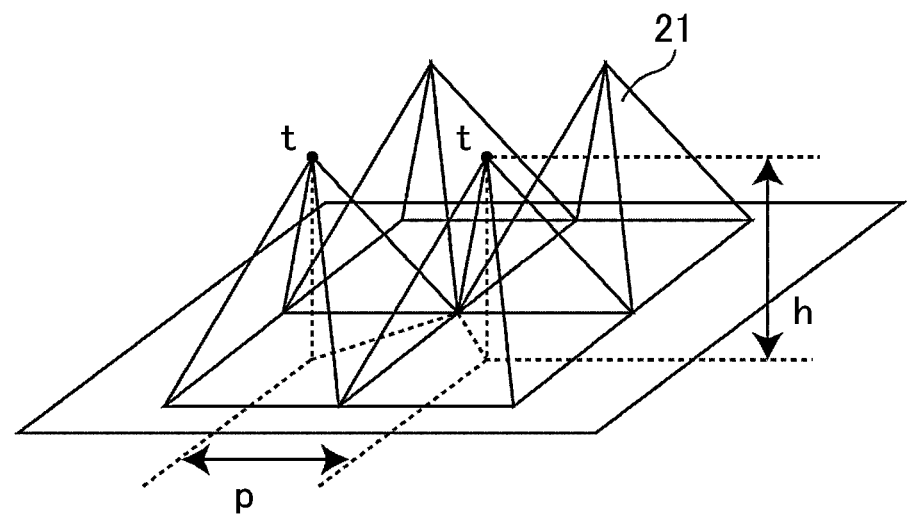
FIG. 13 is a perspective schematic view of protrusions of a moth-eye structure in an anti-reflection film of Embodiment 1.
Figure 14:
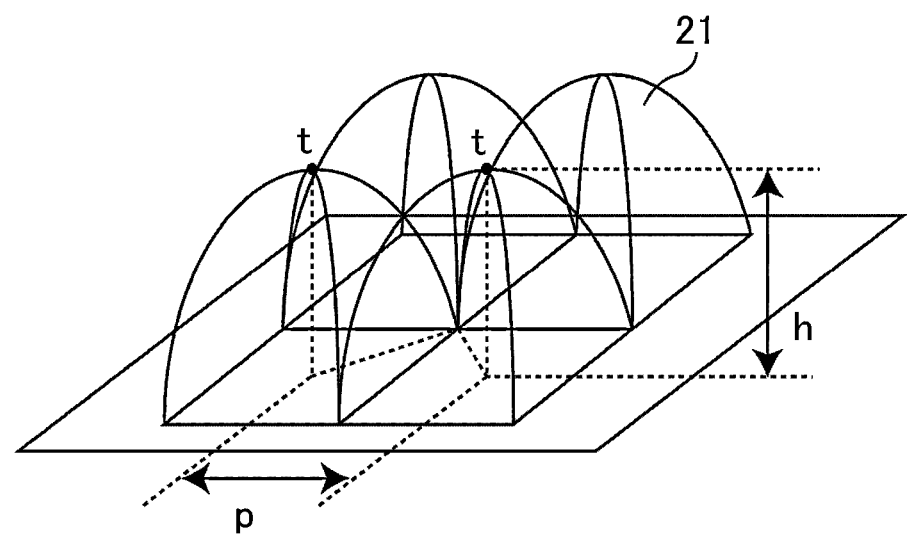
FIG. 14 is a perspective schematic view of protrusions of a moth-eye structure in an anti-reflection film of Embodiment 1.
Figure 15:
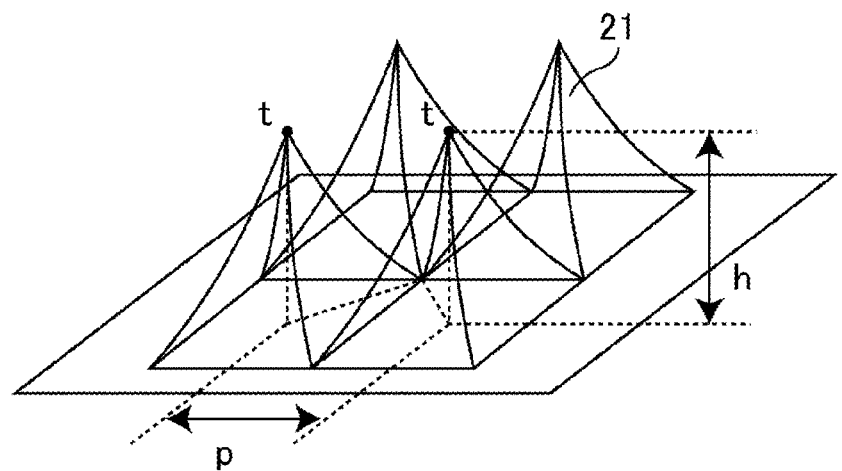
FIG. 15 is a perspective schematic view of protrusions of a moth-eye structure in an anti-reflection film of Embodiment 1.

FIG. 12 to FIG. 15 show examples of more specific shapes of the protrusions 21. Each protrusion 21 may be in a circular cone shape as shown in FIG. 12, in a quadrangular pyramid shape as shown in FIG. 13, in a dome-like (bell-like) shape including an outwardly curved side face between the apex to the bottom as shown in FIG. 14, or in a needle-like shape including steeply angled side faces between the apex to the bottom. Moreover, for example, each protrusion 21 may be in a circular or polygonal cone shape having steps in the side face(s).

As shown in FIG. 12 to FIG. 15, provided that t represents the apex of each protrusion 21, the pitch p between the protrusions 21 is expressed by a distance between two points at which hypothetical perpendicular lines from adjacent apexes reach the hypothetical plane. The height h of each protrusion 21 is expressed by a distance (shortest distance) from the apex t to the hypothetical plane.

For preventing the reflection-preventing performance from being anisotropic, the protrusions 21 are preferably arranged in a dotted pattern as shown in FIG. 12 to FIG. 15, but may be linearly formed.

The anti-reflection film of the present embodiment may be used for any application. For example, it may be used for building-products, protective plates, protective cases, or the like, especially preferably for display devices.

The present embodiment also includes a display device including the anti-reflection film of the present embodiment. The display device may be of any kind. Examples include liquid crystal displays, organic or inorganic EL displays, plasma panel displays, cathode-ray tube displays, and microcapsule-type electrophoresis electronic papers.

Example 1

An anti-reflection film of Embodiment 1 was actually produced as Example 1. A film (hereinafter, also referred to as a HC-TAC film) in which a HC layer is formed on a TAC film was used as a substrate 16. A solvent mixture containing methyl ethyl ketone (MEK) and toluene at a weight ratio of 5:5 was used as a solvent. An ultraviolet-ray curable resin composition was used as a resin composition. The solvent and the resin composition were used at a weight ratio of 6:4. The solvent component was removed by air-drying after separation from a plate. The operations were performed in an unclean laboratory so that a solvent-containing resin was allowed to naturally contact foreign matter. Each protrusion in the moth-eye structure had a height of approximately 200 nm (in a range of 100 nm to 270 nm). The pitch of the protrusions was approximately 100 nm (in a range of 70 nm to 130 nm). The resin composition was controlled so that resin without cavities formed only from the resin composition had a refractive index of around 1.5.

Figure 16:
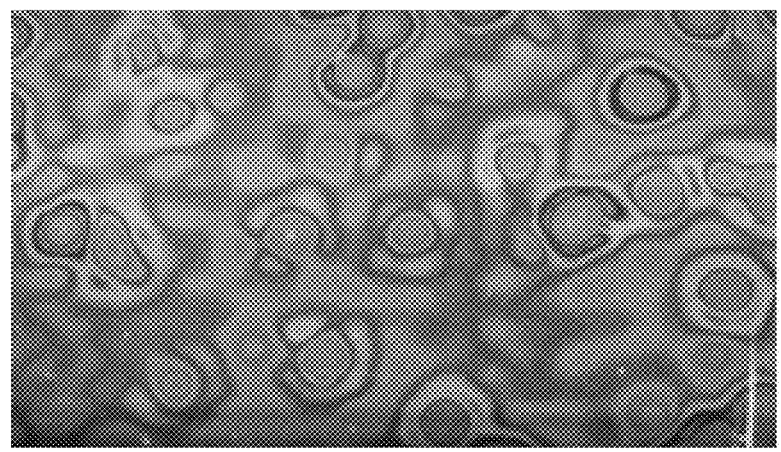
FIG. 16 is a photograph of a sample in which an anti-reflection film of Example 1 is attached to a black acrylic board.

FIG. 16 is a photograph of a sample in which an anti-reflection film of Example 1 is attached to a black acrylic board.

As shown in FIG. 16, an interference pattern could be generated on the anti-reflection film of Example 1.

The following will describe one example of the thickness of the resin layer in the case where an interference pattern is generated.

Figure 17:
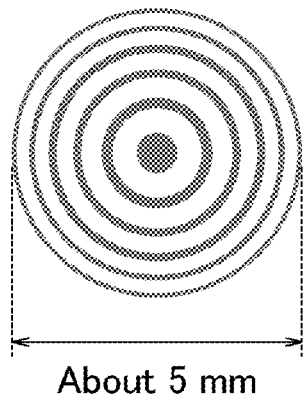
FIG. 17 is a schematic plan view illustrating an interference pattern which appears on an anti-reflection film of Example 1.
Figure 18:
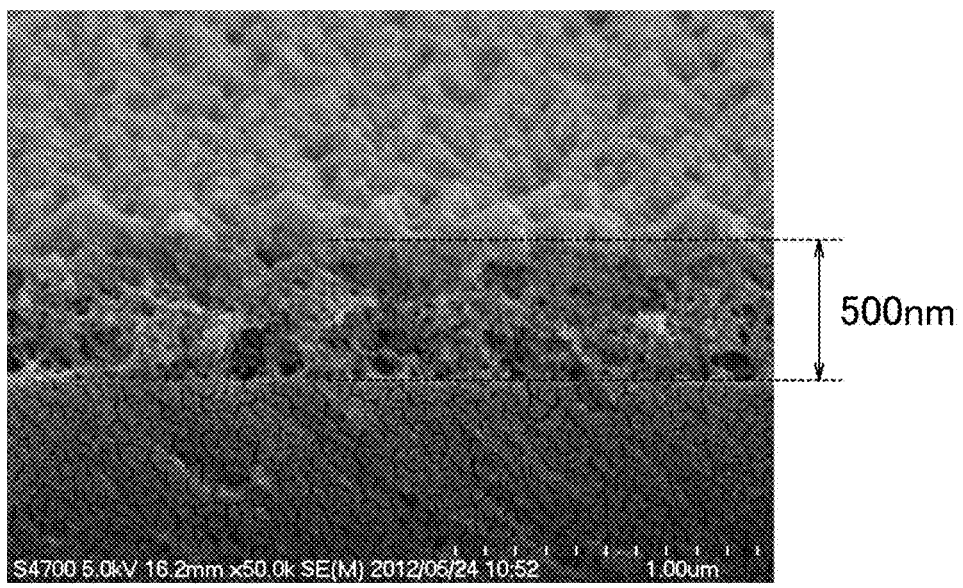
FIG. 18 is an SEM photograph of a cross section of an anti-reflection film of Example 1.
Figure 19:
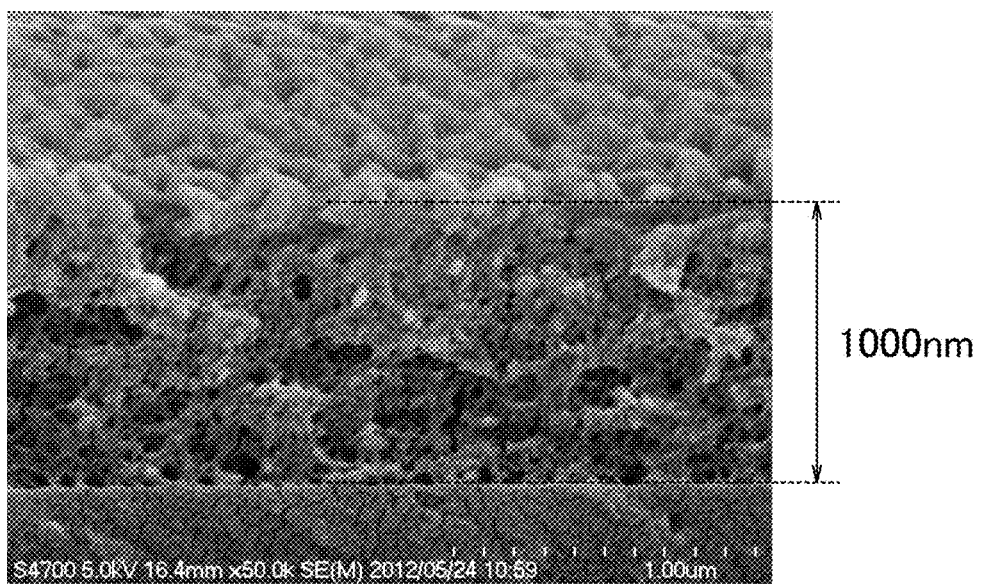
FIG. 19 is an SEM photograph of a cross section of an anti-reflection film of Example 1.

FIG. 17 is a schematic plan view illustrating an interference pattern which appears on an anti-reflection film of Example 1. FIG. 18 and FIG. 19 each are an SEM photograph of a cross section of an anti-reflection film of Example 1.

FIG. 18 shows a photographic image of a cross section of a resin layer at a site near the center of a ring-shaped interference pattern which has a diameter of approximately 5 mm shown in FIG. 17. As shown in FIG. 18, the thickness of the resin layer, especially of a base portion, at the site was about 50 nm. FIG. 19 shows a photographic image of a cross section of a resin layer at an end of the interference pattern shown in FIG. 17. As shown in FIG. 19, the thickness of the resin layer, especially of a base portion, at the site was about 1000 nm, which was larger than the thickness at the center portion shown in FIG. 18. The result indicates that the anti-reflection film of Example 1 can generate an interference pattern by the mechanism described with reference to FIG. 1 and FIG. 4.

In the case where, in the formula (1), m is substituted with an integer so that λ is within a range of visible light wavelength, a colored interference pattern is observed. In the case of a resin layer having a refractive index n of 1.44 to light having a wavelength of 550 nm, if, for example, the base portion has a thickness d of $500\times10^{-9}$ m (hereinafter, also referred to as first condition), a light line (yellowish green) with λ of $576\times10^9$ m appears when m is 2; and a light line (purple) with λ of $411\times10^{-9}$ m appears when m is 3. If, for example, the base portion has a thickness of $1100\times10^{-9}$ m (hereinafter, also referred to as second condition), a light line (red) with λ of $704\times10^{-9}$ m appears when m is 4; a light line (yellow) with λ of $576\times10^{-9}$ m appears when m is 5; a light line (pale blue) with λ of $576\times10^{-9}$ m appears when m is 6; and a light line (blue to purple) with λ of $411\times10^{-9}$ m appears when m is 7.

Figure 20:
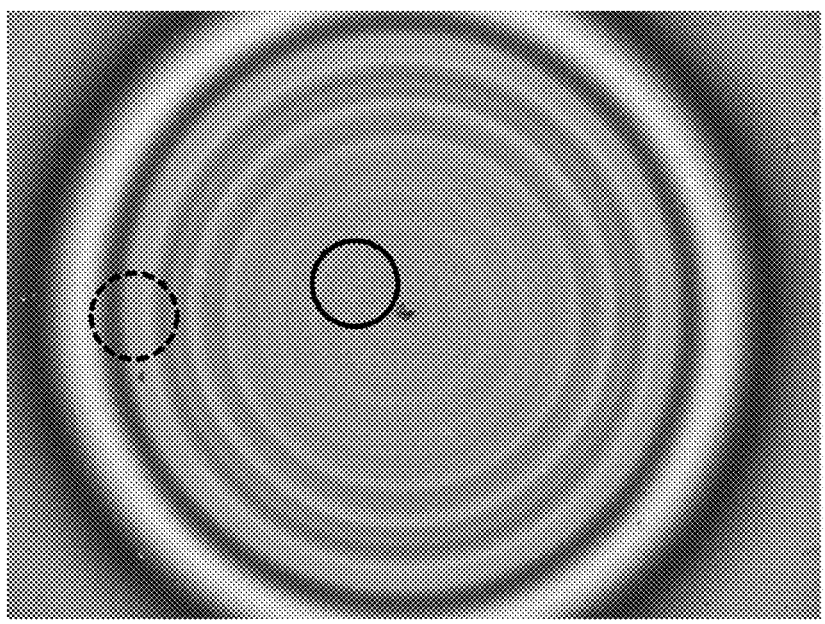
FIG. 20 is an optical micrograph of an anti-reflection film of Example 1.

FIG. 20 is an optical micrograph of the anti-reflection film of Example 1.

The resin layer in the anti-reflection film of Example 1 had a refractive index n of about 1.44 to light having a wavelength of 550 nm. Yellowish green light lines and purple light lines appeared in a region of the circle with a solid line in FIG. 20. These light lines correspond to light lines under the first condition, and thus the base portion in this region is considered to have a thickness of approximately $500\times10^{-9}$ m. A red light line, a yellow light line, a pale blue light line, and a blue to purple light line appeared in a region of the circle with a dashed line in FIG. 20. These light lines correspond to light lines under the second condition, and thus the base portion in this region is considered to have a thickness of approximately $1000\times10^{-9}$ m. The calculation results agree well with the color distribution in the interference pattern shown in FIG. 20. The results also indicate that a non-uniform thickness of the resin layer, especially the base portion, causes an interference pattern in the anti-reflection film of the present embodiment.

Further, if n is 1.7 in the formula (1), the thickness d needed for light having a shortest visible light wavelength (=360 nm) is 52.94 nm when m is 0. This indicates that the base portion preferably has a thickness of 50 nm or more in the anti-reflection film of Embodiment 1. The following will describe why n is set to 1.7 for determining a preferable lower limit value for the base portion. For achieving the low reflection effect of the moth-eye structure, the maximum difference in the refractive indexes of the resin layer and the substrate is about 0.2 as described above. Further, a HC layer of the substrate used in the examples had a refractive index of about 1.5 as described below. Based on these values, 0.2 is added to 1.5, and accordingly n is set to 1.7. The base portion more preferably has a thickness of 300 nm or more. Although the maximum thickness of the base portion is not limited, it is preferably 100 µm or less in view of practical use of the anti-reflection film.

Figure 21:
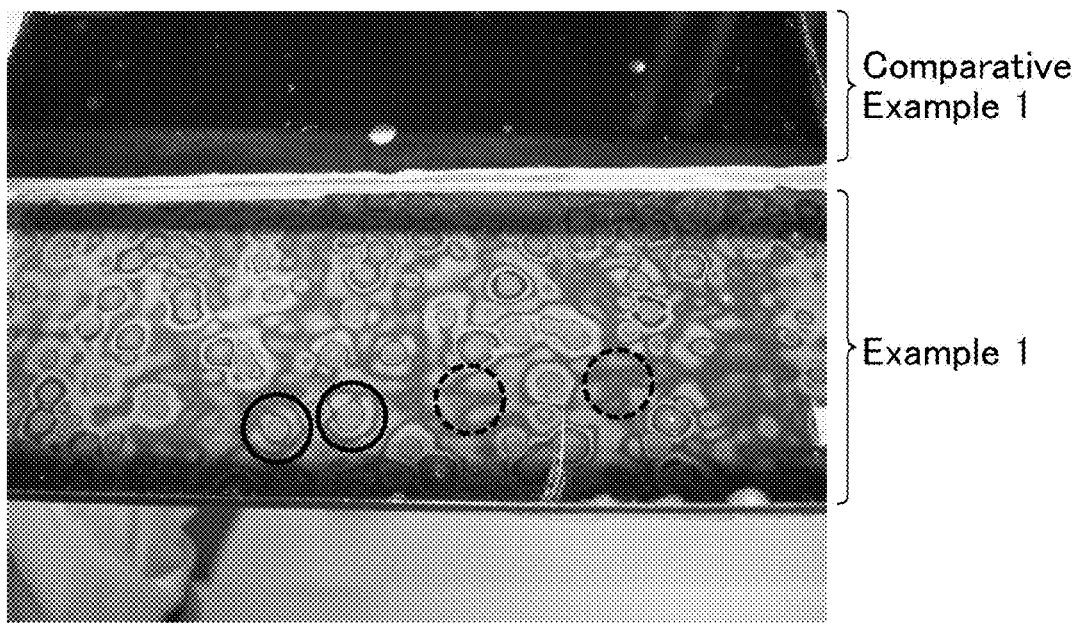
FIG. 21 is a photograph of a sample including an anti-reflection film of Example 1 and an anti-reflection film of Comparative Example 1.

FIG. 21 is a photograph of a sample including an anti-reflection film of Example 1 and an anti-reflection film of Comparative Example 1.

An anti-reflection film of Comparative Example 1 is a common moth-eye film. FIG. 21 shows that the anti-reflection film of Comparative Example 1 does not have designability, whereas the anti-reflection film of Example 1 has designability. Common LR or AR films also do not have designability.

In a portion with foreign matter (a region surrounded by a circle with a solid line in FIG. 21), the resin layer (base portion) has a greater thickness, which increases gradually, at a site farther from the foreign matter. Thus, a cyclic interference pattern with its center being at the foreign matter is generated. An interference pattern is also generated in a portion without foreign matter (a region surrounded by a circle with a dashed line in FIG. 21). Presumably, this pattern is formed by flow of solvent components.

Figure 22:
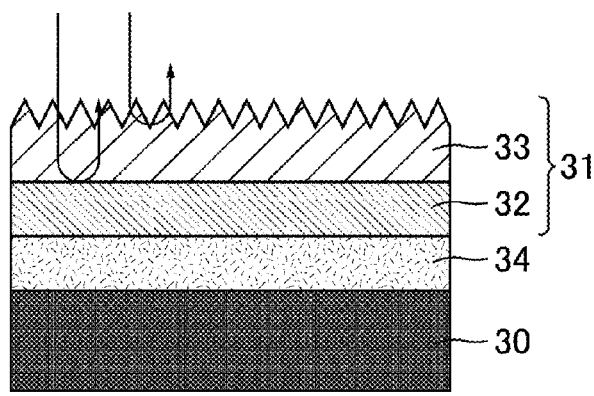
FIG. 22 is a schematic cross-sectional view of a part (a part including an anti-reflection film of Example 1) of the sample shown in FIG. 21.

FIG. 22 is a schematic cross-sectional view of a part (a part including an anti-reflection film of Example 1) of the sample shown in FIG. 21.

As shown in FIG. 22, the sample includes a black acrylic board 30 and an anti-reflection film 31 of Example 1. The anti-reflection film 31 is attached to the black acrylic board 30 using an adhesive paste 34. The anti-reflection film 31 includes a HC-TAC film 32 as a substrate, and a resin layer 33 formed on the HC-TAC film 32. The resin layer 33 has a moth-eye structure formed on its surface. The moth-eye structure of the anti-reflection film 31 enables easy visual observation of an interference pattern as shown in FIG. 21. Although an interference pattern can be generated without moth-eye structure, the pattern cannot be easily observed with eyes. This is because reflected light on the surface of the resin layer is stronger than reflected light on the interface between the resin layer and the substrate so that the former light is dominant.

Figure 23:
FIG. 23 is a photograph of a sample including an anti-reflection film of Example 1 and an anti-reflection film of Comparative Example 2.

FIG. 23 is a photograph of a sample including an anti-reflection film of Example 1 and an anti-reflection film of Comparative Example 2.

The anti-reflection film of Comparative Example 2 was prepared in the same manner as the anti-reflection film of Example 1, except that the plate having an inverted shape of the moth-eye structure on its surface was replaced with a flat glass plate. The anti-reflection film of Comparative Example 2 is substantially the same as the anti-reflection film of Example 1 except for not having the moth-eye structure on the surface. In FIG. 23, the anti-reflection film of Example 1 is disposed on the right side and the anti-reflection film of Comparative Example 2 is disposed on the left side.

Figure 24:
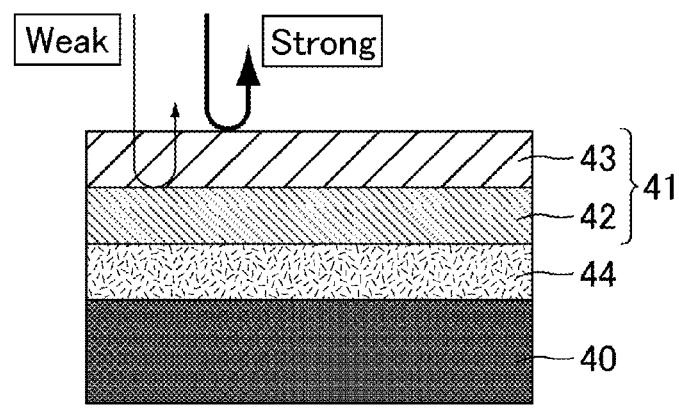
FIG. 24 is a schematic cross-sectional view of a part (a part including an anti-reflection film of Comparative Example 2) of the sample shown in FIG. 23.
Figure 25:
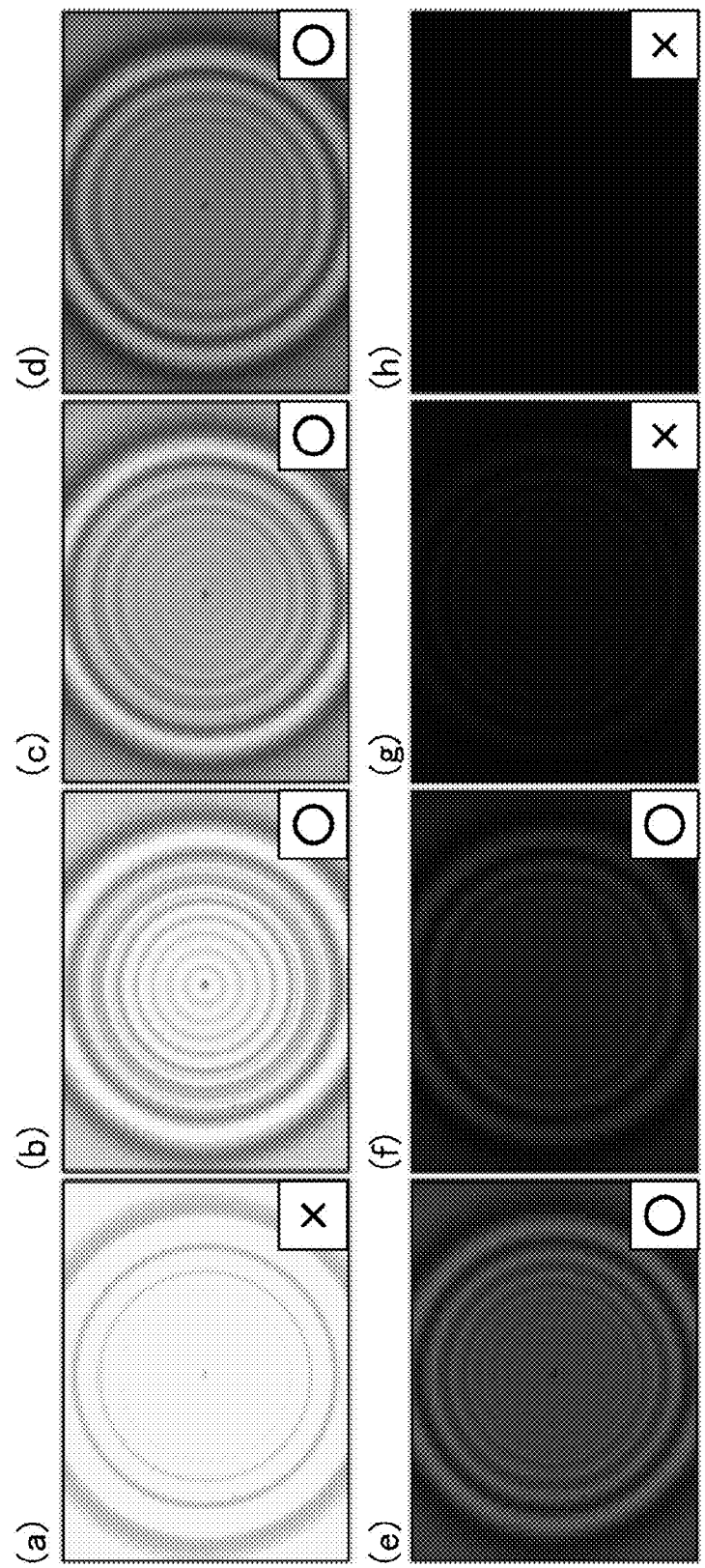
FIGS. 25(a) to 25(h) each are an optical micrograph of an anti-reflection film of Example 1.
Figure 26:
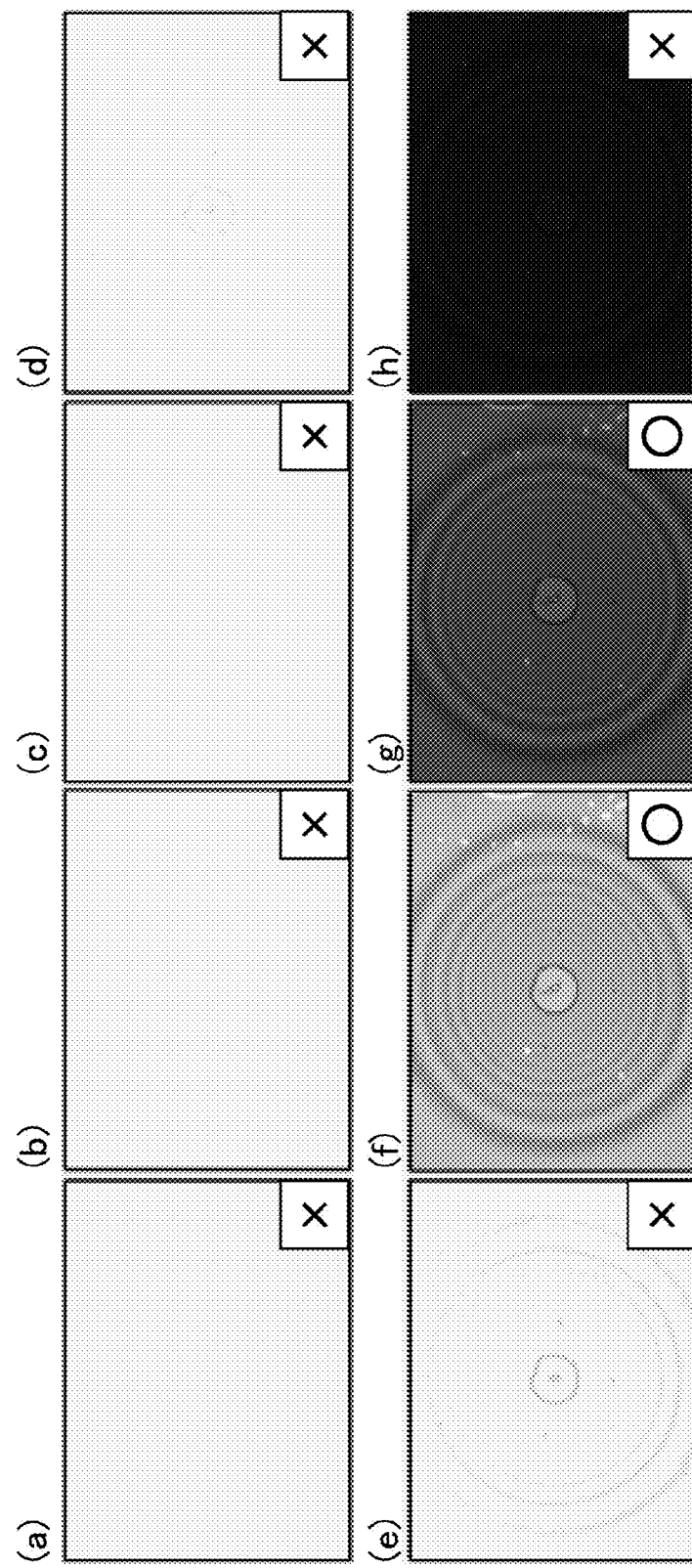
FIGS. 26(a) to 26(h) each are an optical micrograph of an anti-reflection film of Comparative Example 2.

FIG. 24 is a schematic cross-sectional view of a part (a part including an anti-reflection film of Comparative Example 2) of the sample shown in FIG. 23.

As shown in FIG. 24, the sample includes a black acrylic board 40 and an anti-reflection film 41 of Comparative Example 2. The anti-reflection film 41 is attached to the black acrylic board 40 using an adhesive paste 44. The anti-reflection film 41 includes a HC-TAC film 42 as a substrate and a resin layer 43 formed on the HC-TAC film 42. The resin layer 43 has a flat surface. As shown in FIG. 23, an interference pattern can also be generated in a region where the anti-reflection film of Comparative Example 2 is disposed by the same principle as the anti-reflection film of Example 1. However, as shown in FIG. 24, the reflectance on the surface of the resin layer 43 with no moth-eye structure is about 4%, which is significantly larger than the reflectance on an interface between the resin layer 43 and the HC-TAC film 42. Thus, the interference pattern does not stand out.

FIGS. 25(a) to 25(h) each are an optical micrograph of an anti-reflection film of Example 1. FIGS. 26(a) to 26(h) each are an optical micrograph of an anti-reflection film of Comparative Example 2.

The visibility of Newton rings was evaluated at eight light intensities of an optical microscope. As shown in FIGS. 25(a) to 25(h), Newton rings were observed at five out of the eight light intensities on the anti-reflection film of Example 1 with a moth-eye structure (FIGS. 25(b) to 25(f)). In contrast, as shown in FIGS. 26(a) to 26(h), Newton rings were observed only at two out of the eight light intensities on the anti-reflection film of Comparative Example 2 having no moth-eye structure (FIG. 26(f) and FIG. 26(g)). The results indicate that Newton rings generated on the anti-reflection film of Example 1 are more visible at a wider range of light intensities as compared to Newton rings generated on the anti-reflection film having no moth-eye structure.

Figure 27:
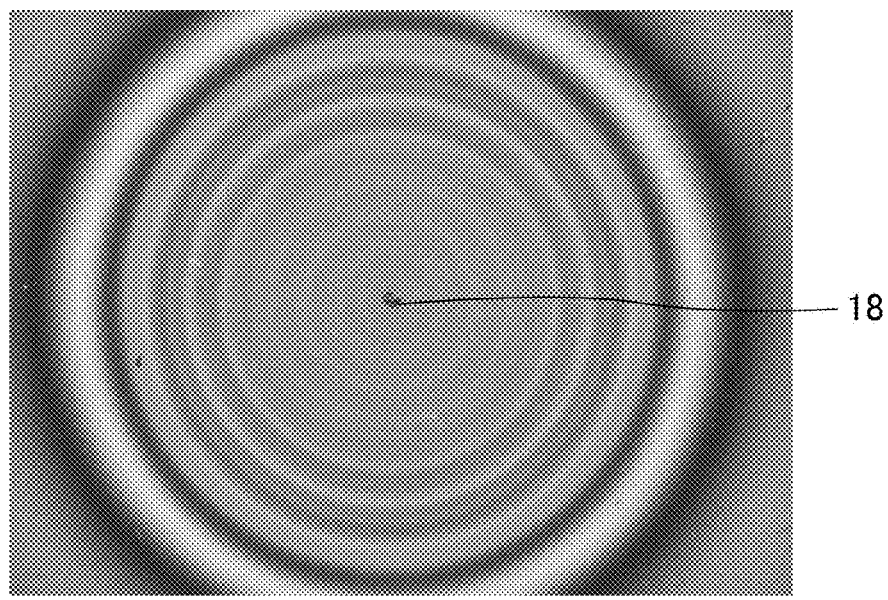
FIG. 27 is an optical micrograph of an anti-reflection film of Example 1.

FIG. 27 is an optical micrograph of an anti-reflection film of Example 1.

As shown in FIG. 27, particulate foreign matter 18 is present at the center of the Newton rings.

Example 2

Figure 28:
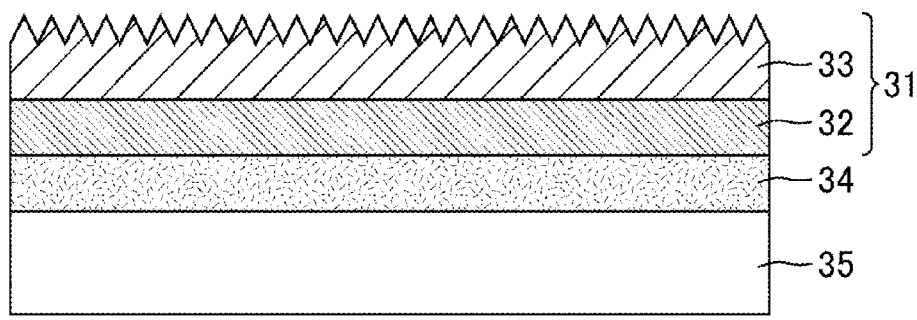
FIG. 28 is a schematic cross-sectional view of a display device of Example 2.

A display device of Embodiment 1 was actually produced as Example 2. FIG. 28 is a schematic cross-sectional view of a display device of Example 2.

As shown in FIG. 28, the display device of Example 2 includes a liquid crystal display 35 and the anti-reflection film 31 of Example 1. The anti-reflection film 31 is attached to the liquid crystal display 35 using an adhesive paste 34. The anti-reflection film 31 includes a HC-TAC film 32 as a substrate, and a resin layer 33 formed on the HC-TAC film 32. The resin layer 33 has a moth-eye structure formed on its surface.

Figure 29:
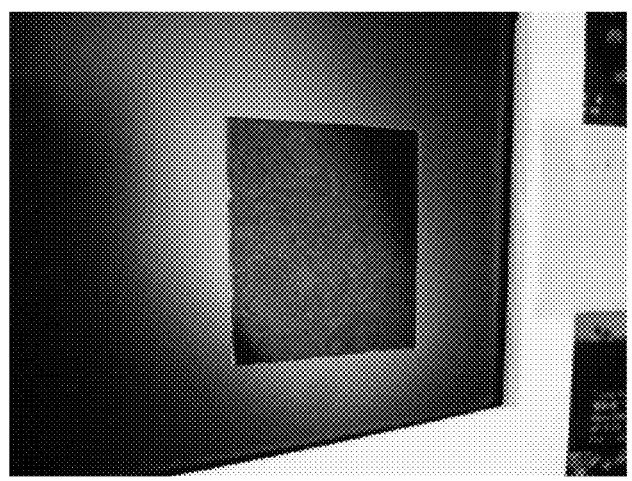
FIG. 29 is a photograph of a display device of Example 2.
Figure 30:
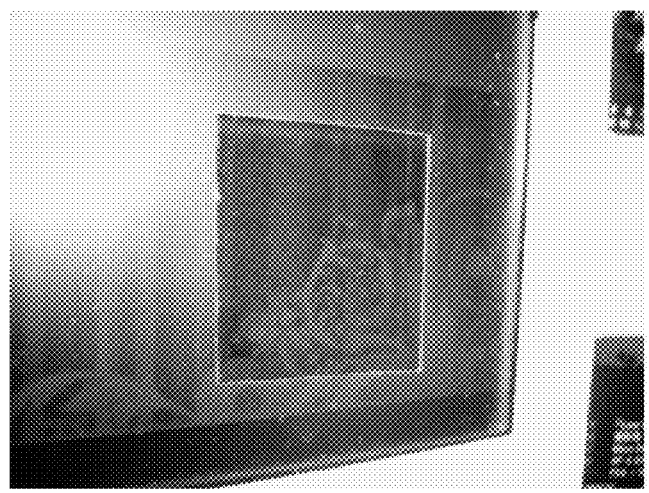
FIG. 30 is a photograph of a display device of Example 2.

FIG. 29 and FIG. 30 each are a photograph of a display device of Example 2. The liquid crystal display is turned off in FIG. 29, whereas the display device is turned on in FIG. 30.

When the liquid crystal display is off, the designability due to an interference pattern is expressed as shown in FIG. 29, as in the case where a black acrylic board is used. When the liquid crystal display is on, the contrast ratio of an interference pattern is decreased by light from a backlight unit of the liquid crystal display so that the interference pattern is far less visible as shown in FIG. 30. Thus, images on the liquid crystal display are visible.

Figure 31:
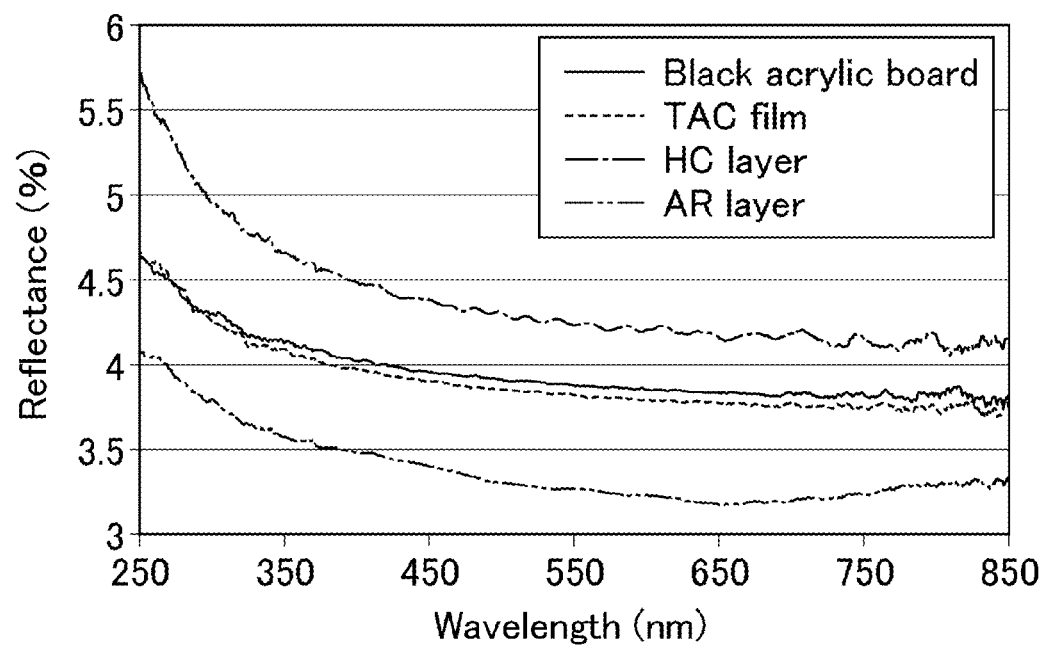
FIG. 31 is a graph showing a reflection spectrum of various members.

FIG. 31 is a graph showing a reflection spectrum of various members.

Figure 32:
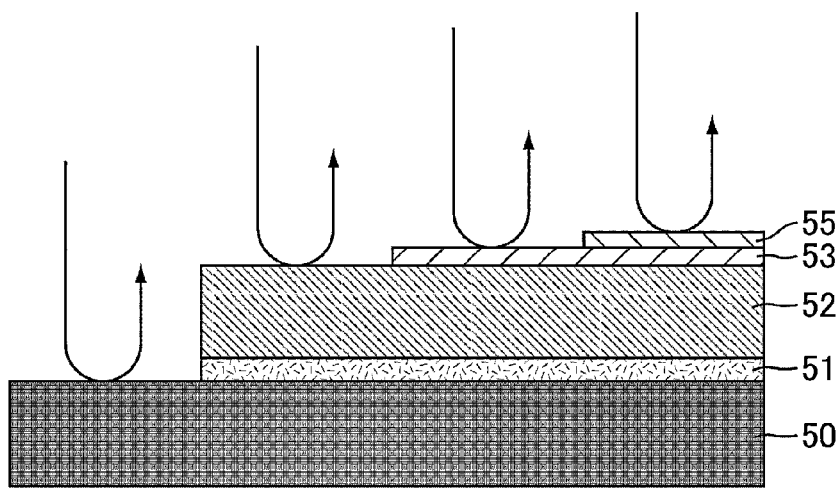
FIG. 32 is a schematic cross-sectional view of a sample used for measuring the reflection spectrum shown in FIG. 31.

FIG. 32 is a schematic cross-sectional view of a sample used for measuring the reflection spectrum shown in FIG. 31. The sample included a black acrylic board 50, an adhesive paste layer 51, a TAC film 52, a HC layer 53, and an anti-reflection (AR) layer 55 as shown in FIG. 31. The AR layer 55 was formed of the same solvent-containing resin used in Example 1. All the layers are flat, and the AR layer 55 has no moth-eye structure. The black acrylic board 50 has a thickness of 3 mm or more. The adhesive paste layer 51 has a thickness of 20 μm. The TAC film 52 has a thickness of 80 μm. The HC layer 53 has a thickness of 2 to 5 μm. The AR layer 55 has a thickness of 5 μm or less.

Figure 33:
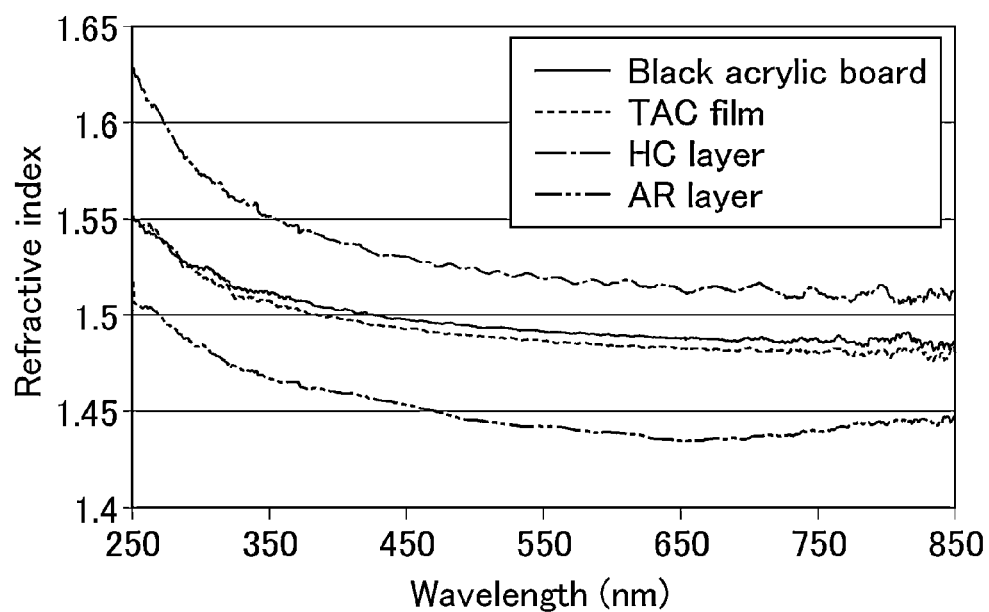
FIG. 33 is a graph showing a refractive index calculated from the reflection spectrum shown in FIG. 31.

FIG. 33 is a graph showing a refractive index calculated from the reflection spectrum shown in FIG. 31.

A refractive index n (FIG. 33) was calculated from a reflectance R (FIG. 31) based on a formula below for determining a reflectance R on an interface between air and a material.

$$R=(n-1)^2/(n+1)^2$$

(n: refractive index of the material)

Strictly speaking, the calculation was partially simplified.

The result reveals that the HC layer 53 has a high refractive index, the AR layer 55 has a low refractive index, and the difference between the refractive indices is around 0.1. The AR layer 55 has a refractive index of around 1.45 which is smaller than the refractive index (around 1.5) of the resin itself.

The result shown in FIG. 33 indicates that the difference between the refractive index of the resin layer and that of the base substrate, especially the HC layer, is around 0.1, and the resin layer has a refractive index of around 1.45.

Figure 34:
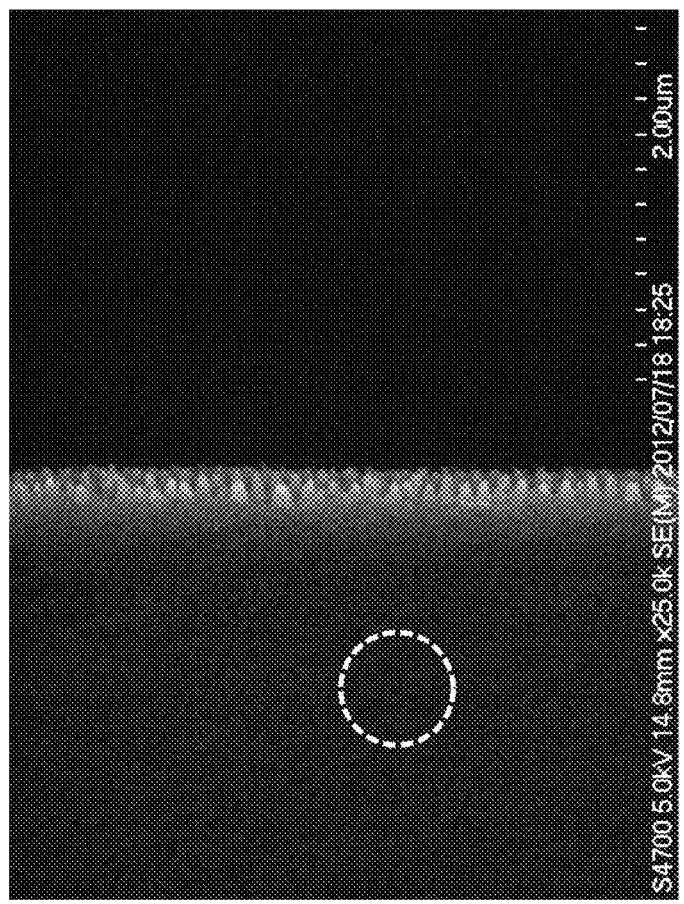
FIG. 34 is an SEM photograph of a cross section of an anti-reflection film of Comparative Example 3.

FIG. 34 is an SEM photograph of a cross section of an anti-reflection film of Comparative Example 3.

Figure 35:
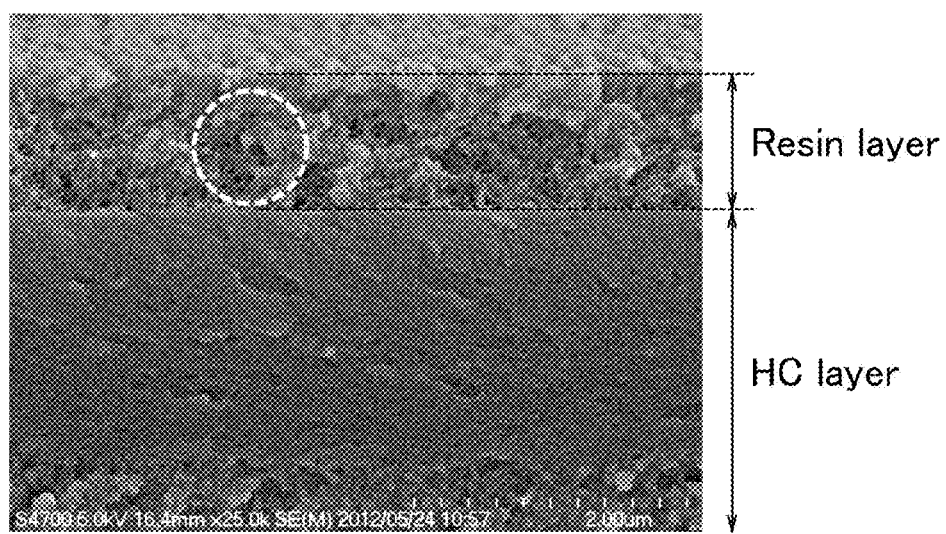
FIG. 35 is an SEM photograph of a cross section of an anti-reflection film of Example 1.

The anti-reflection film of Comparative Example 3 was prepared in the same manner as the anti-reflection film of Example 1, except that the solvent-containing resin was replaced with a resin composition free of a solvent. As shown in FIG. 35, no cavity is formed in the resin layer of the anti-reflection film of Comparative Example 3.

Figure 36:
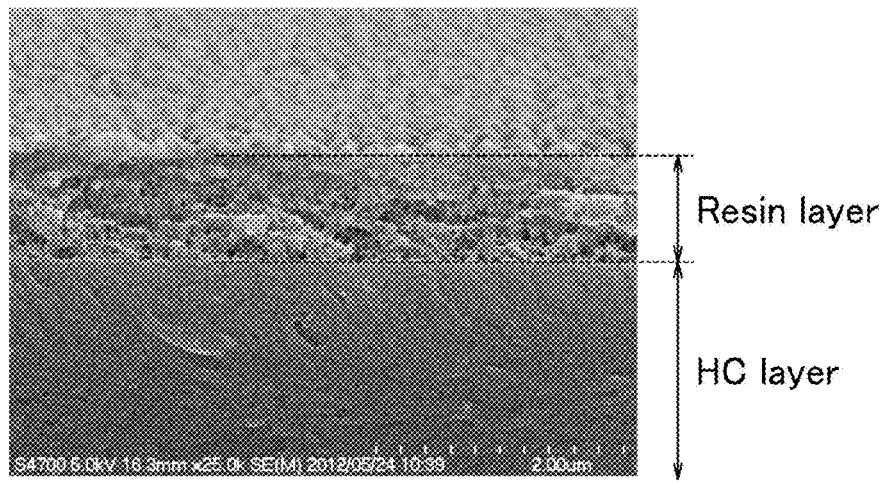
FIG. 36 is an SEM photograph of a cross section of an anti-reflection film of Example 1.

FIG. 35 and FIG. 36 each are an SEM photograph of a cross section of an anti-reflection film of Example 1.

As shown in FIG. 35 and FIG. 36, the resin layer of the anti-reflection film of Example 1 contains a large number of cavities, presumably for the following reason. The resin composition still containing the solvent was exposed to light so that resin was cured in the solvent which was not cured. Air (refractive index=1) in the large number of cavities allows the resin layer of the anti-reflection film of Example 1 to have such reflection characteristic as shown in FIG. 31, and the resin layer has a lower refractive index than the HC layer.

Figure 37:
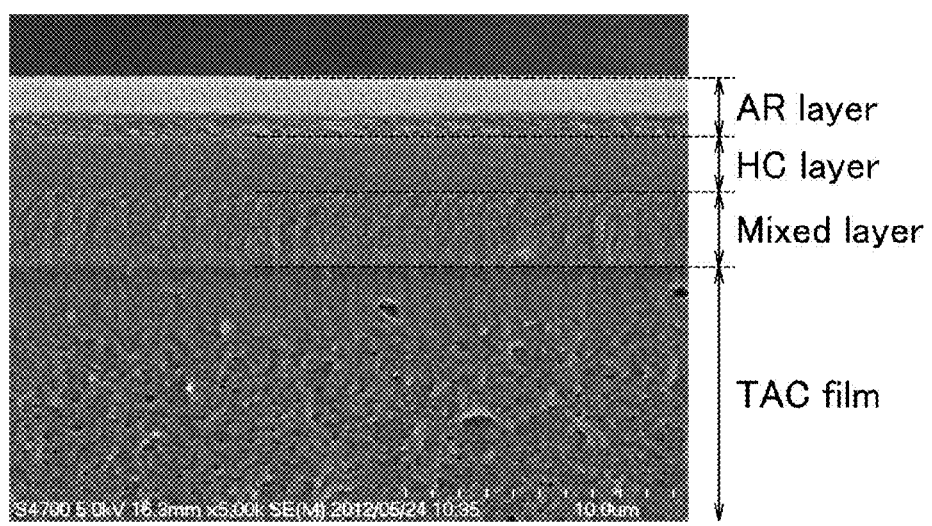
FIG. 37 is an SEM photograph of a cross section of an anti-reflection film of Example 1.
Figure 38:
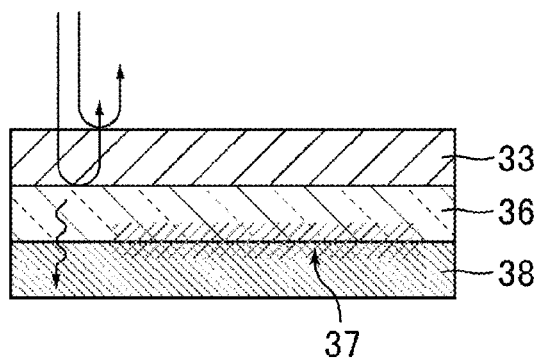
FIG. 38 is a schematic cross-sectional view of an anti-reflection film of Example 1.

FIG. 37 is an SEM photograph of a cross section of an anti-reflection film of Example 1. FIG. 38 is a schematic cross-sectional view of an anti-reflection film of Example 1.

Before a resin for a HC layer is applied to a TAC film, a solvent is usually added to the resin for a HC layer to reduce the viscosity for enhancing the coating property. Thus, the HC-TAC film used in Example 1 is considered to include a mixed layer (mixing layer) between the HC layer 36 and the TAC film 38 as shown in FIG. 37 and FIG. 38. Also, a distinct interface is considered to exist between the resin layer 33 and the HC layer 36 as shown in FIG. 35 to FIG. 38. No interference pattern was recognized by observation of only the HC-TAC film presumably because of the mixed layer between the HC layer and the TAC film.

Figure 39:
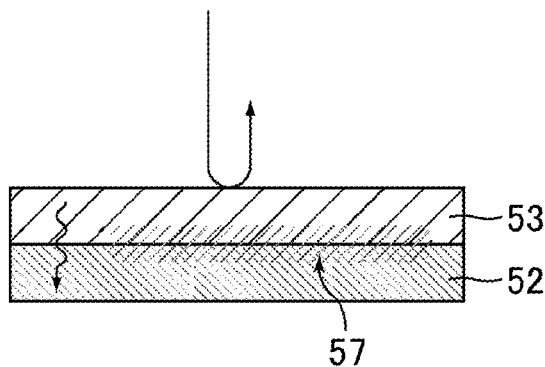
FIG. 39 is a schematic cross-sectional view of an anti-reflection film of Comparative Example 4.

FIG. 39 is a schematic cross-sectional view of an anti-reflection film of Comparative Example 4.

An anti-reflection film of Comparative Example 4 was produced as in Embodiment 1 using a TAC film with no HC layer. No interference pattern appeared on the anti-reflection film of Comparative Example 4, presumably for the following reason. Since a TAC film with no HC layer was used, a solvent component permeated the TAC film, thereby damaging an interface where the refractive index changes. In other words, a mixed layer 57 formed between the resin layer 53 and the TAC film 52 as shown in FIG. 39 obscures an interface between the resin layer 53 and the TAC film 52, resulting in less reflection on the interface.

Figure 40:
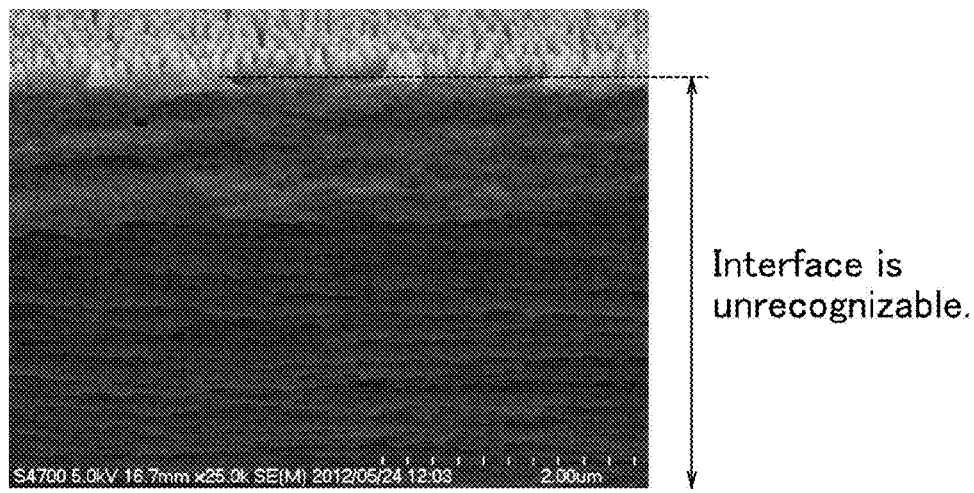
FIG. 40 is an SEM photograph of a cross section of an anti-reflection film of Comparative Example 4.
Figure 41:
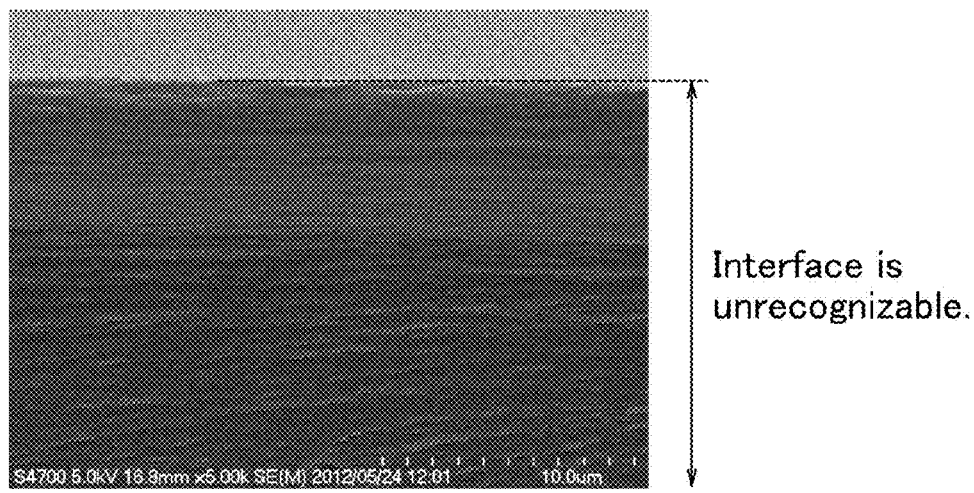
FIG. 41 is an SEM photograph of a cross section of an anti-reflection film of Comparative Example 4.

FIG. 40 and FIG. 41 each are an SEM photograph of a cross section of an anti-reflection film of Comparative Example 4.

As shown in FIG. 40 and FIG. 41, an interface between a resin layer and a TAC film is unrecognizable in Comparative Example 4.

Example 3

An anti-reflection film of Example 3 was produced in the same manner as in Example 1, except that an acrylic film was used as a substrate instead of the HC-TAC film.

Figure 42:
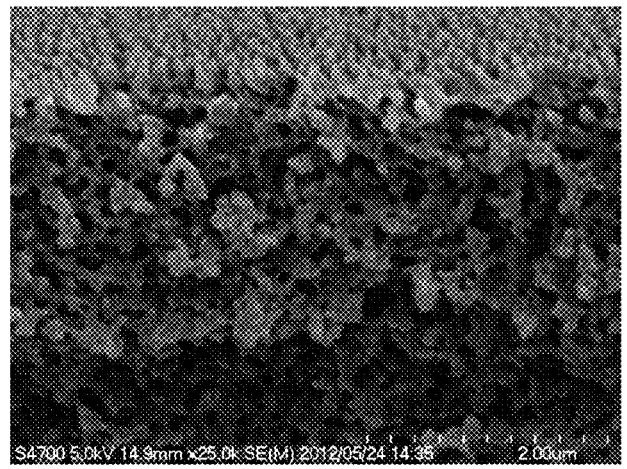
FIG. 42 is an SEM photograph of a cross section of an anti-reflection film of Example 3.
Figure 43:
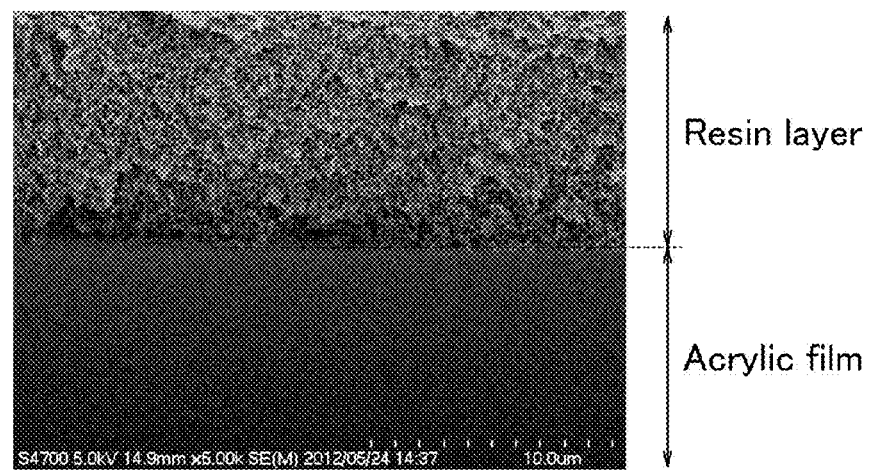
FIG. 43 is an SEM photograph of a cross section of an anti-reflection film of Example 3.

FIG. 42 and FIG. 43 each are an SEM photograph of a cross section of an anti-reflection film of Example 3

As shown in FIG. 42, the resin layer of the anti-reflection film of Example 3 contained a large number of cavities. Also, a distinct interface was recognizable between the acrylic film and the resin layer in the anti-reflection film of Example 3 as shown in FIG. 43.

Embodiment 2

The present embodiment is substantially the same as Embodiment 1 except for using a different solvent-containing resin. Thus, overlapping descriptions with Embodiment 1 will be omitted, and mainly features specific to the present embodiment will be described in the present embodiment.

The present embodiment uses a resin solid having insufficient compatibility with the solvent. Thus, the concentration of the solvent component can be more positively varied in the solvent-containing resin.

Figure 44:
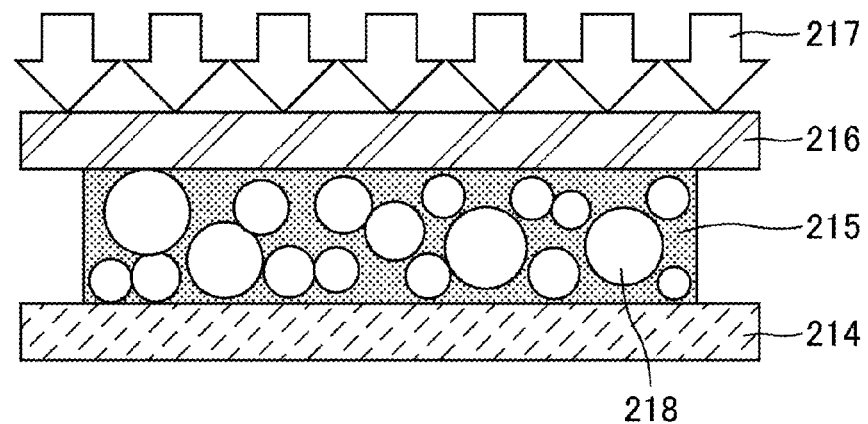
FIG. 44 is a schematic cross-sectional view of members in a process (exposure to light) of production of an anti-reflection film of Embodiment 2.
Figure 45:
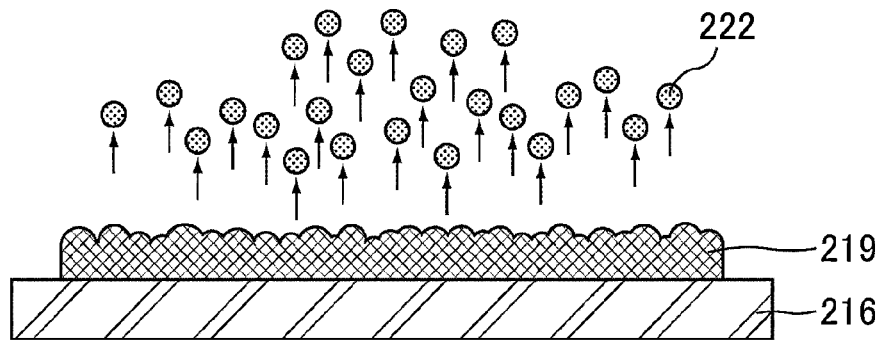
FIG. 45 is a schematic cross-sectional view of members in a process (drying) of production of an anti-reflection film of Embodiment 2.

FIG. 44 is a schematic cross-sectional view of members in a process (exposure to light) of production of an anti-reflection film of Embodiment 2. FIG. 45 is a schematic cross-sectional view of members in a process (drying) of production of an anti-reflection film of Embodiment 2

As shown in FIG. 44, in the case where a resin solid 218, that is, a resin composition in a solvent-containing resin, has insufficient compatibility with the solvent component, the resin solid 218 is randomly dispersed in a solvent-containing resin 215 disposed between a plate 214 and a substrate 216, resulting in uneven distribution of the solvent component. Thus, as shown in FIG. 45, the volatilized amount of a solvent component 222 varies according to positions so that the thickness of a resin layer 219 varies according to positions. The resin layer 219 has a film thickness distribution according to the distribution of the concentration of the solvent component. Hence, the anti-reflection film of the present embodiments is an anti-reflection member capable of generating an interference pattern.

Examples of the resin solid 218 include acrylic resin compositions containing various additives. Examples of the solvent include a mixed solvent containing methyl ethyl ketone (MEK) and toluene at a weight ratio of 5:5. The ratio (weight ratio) of the resin solid:solvent may be, for example, 4:6.

Embodiment 3

The present embodiment is substantially the same as Embodiment 1, except that the concentration of a solvent component is varied by a different technique. Thus, overlapping descriptions with Embodiment 1 will be omitted, and mainly features specific to the present embodiment will be described in the present embodiment.

The present embodiment employs a method that can more positively cause variations in the thickness of the resin layer.

Figure 46:
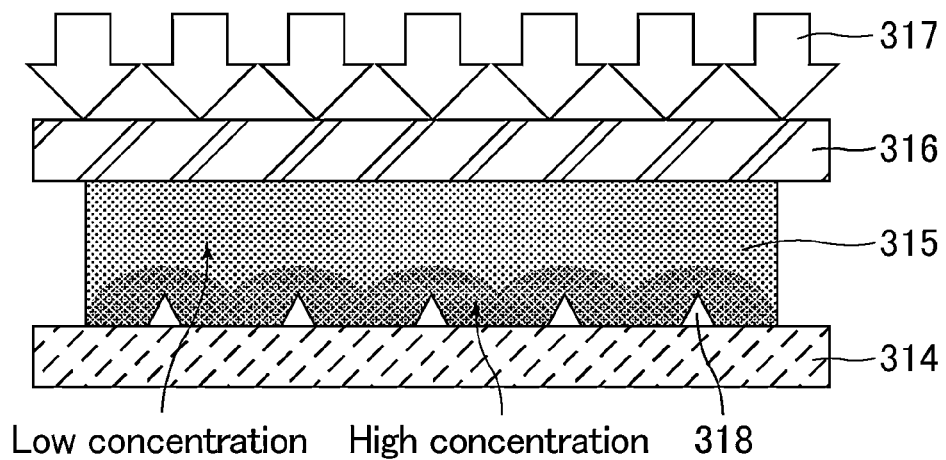
FIG. 46 is a schematic cross-sectional view of members in a process (exposure to light) of production of an anti-reflection film of Embodiment 3.
Figure 47:
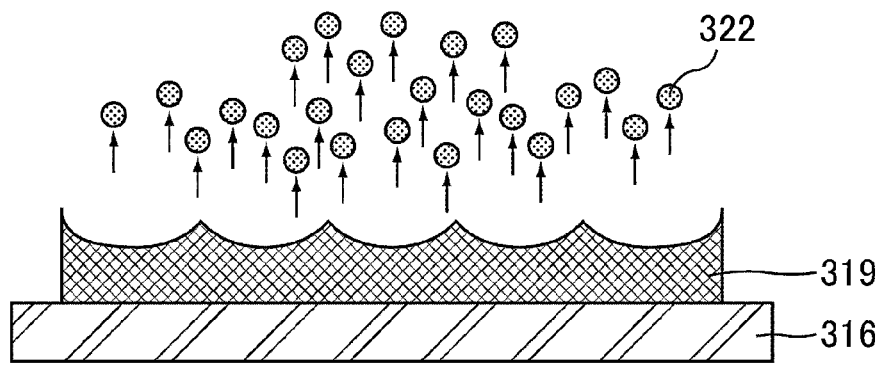
FIG. 47 is a schematic cross-sectional view of members in a process (drying) of production of an anti-reflection film of Embodiment 3.

FIG. 46 is a schematic cross-sectional view of members in a process (exposure to light) of production of an anti-reflection film of Embodiment 3. FIG. 47 is a schematic cross-sectional view of members in a process (drying) of production of an anti-reflection film of Embodiment 3.

First, a structure 318 is preliminarily formed on a plate 314 as shown in FIG. 46. The structure 318 is a kind of bodies other than the plate 314, a solution-containing resin 315 and a substrate 316. When the solvent-containing resin 315 contacts the plate 314 and the structure 318, the solvent component locally gathers near the structure 318 as shown in FIG. 46. Since the structure 318 is of a different kind from the plate 314, usually the plate 314 and the structure 318 are considered to have a different surface condition (for example, surface energy) from each other. The plate 314 has a hydrophobic surface as described above, while the structure 318 presumably has a different level of affinity to water from the surface of the plate 14. Thus, the concentration distribution of the solvent component corresponds to the position of the structure 318. As shown in FIG. 47, a solvent component 322 volatilizes in a larger amount near the structure 318. As a result, the thickness of the resin layer 319 varies according to the position of the structure 318. Specifically, the resin layer 319 has a smaller thickness at a site closer to the structure 318 in the periphery of the structure 318. In other words, the thickness of the base portion of the resin layer 319 is greater at a site farther from the structure 318 within a region (any region) including the structure 318. Accordingly, the present embodiment can more easily control interference patterns. The size of the region is not particularly limited. The thickness of the base portion may gradually increase from the structure 318 within a region of about 1 cm from the structure 318.

The structure 318 is not particularly limited as long as it causes the resin layer 319 to have a non-uniform thickness. Preferably, the structure 318 can locally gather the solvent component and has a higher affinity to the solvent than the plate 314 and substrate 316.

The structure 318 may be formed by any method. Examples of the method for forming the structure 318 include nano-imprinting technology and other diversified lithography technologies, and application technologies using an ink jet or a spray. Moreover, the structure 318 may be formed by adhesion of a fingerprint to the plate 314. In this case, the structure 318 may be formed of oil of the palm of a hand.

The structure 318 may be formed linearly or in a dotted pattern, or may be formed into a sheet. The structure 318 may be in any size. Considering the size of an interference pattern, the structure 318 in a dotted pattern has a size of preferably 500 nm or larger but 10 mm or smaller, more preferably 1 µm or larger but 1 mm or smaller in a plan view of the anti-reflection film. In a similar point of view, a sheet of the structure 318 has a size of preferably 1 µm or larger but 1 mm or smaller, more preferably 5 µm or larger but 500 µm or smaller in a plan view of the anti-reflection film. A line of the structure 318 has a width of preferably 5 µm or more but 100 mm or less, more preferably 50 µm or more but 50 mm or less in a plan view of the anti-reflection film. The size of the structure 318 in the thickness direction of the anti-reflection film, that is, the height of the structure 318, is preferably 50 nm or larger but 10 mm or smaller, more preferably 1000 nm or larger but 1 mm or smaller when it is in a dotted pattern; preferably 50 nm or larger but 1 mm or smaller, more preferably 1000 nm or larger but 500 µm or smaller when it is a sheet; and preferably 50 nm or larger but 100 mm or smaller, more preferably 1000 nm or larger but 50 mm or smaller when it is a line, considering the height of each protrusion of the moth-eye structure and the size of the structure 318 in the plan view.

Figure 48:
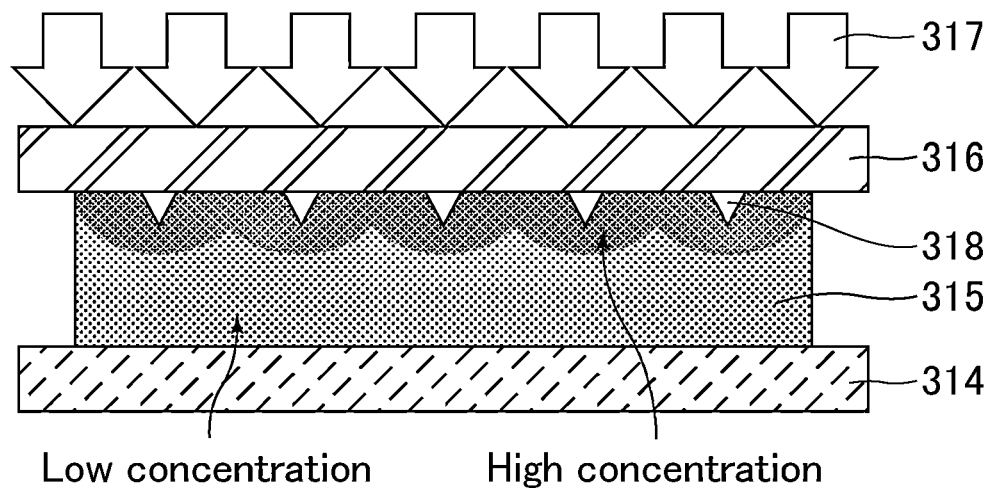
FIG. 48 is a schematic cross-sectional view of members in a process (exposure to light) of production of an anti-reflection film of Embodiment 3 (modified example).
Figure 49:
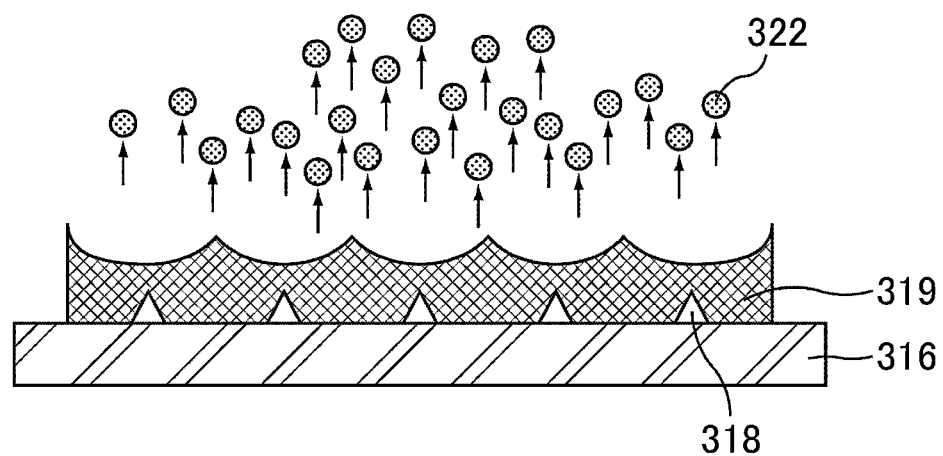
FIG. 49 is a schematic cross-sectional view of members in a process (drying) of production of an anti-reflection film of Embodiment 3 (modified example).

FIG. 48 is a schematic cross-sectional view of members in a process (exposure to light) of production of an anti-reflection film of Embodiment 3 (modified example). FIG. 49 is a schematic cross-sectional view of members in a process (drying) of production of an anti-reflection film of Embodiment 3 (modified example).

The structure 318 may be preliminarily formed on the substrate 316 as shown in FIG. 48. As shown in FIG. 49, the film thickness of the resin layer 319 can be controlled by such a structure.

The above embodiments and examples are described based on the case of using a photocurable resin composition. The resin composition may be replaced with a thermosetting resin composition or a photocurable thermosetting resin composition.

Embodiments 1 to 3 may be appropriately combined. For example, both of foreign matter and a structure may be used.

REFERENCE SIGNS LIST 10, 12, 16, 216, 316: substrate
11: convex lens
13, 19, 33, 43, 53, 219, 319: resin layer
14, 214, 314: plate
15, 215, 315: solvent-containing resin
18: foreign matter
20: moth-eye structure
21: protrusions
22, 222, 322: solvent component
23: base portion
24: diamond cutter
25: pinhole
30, 40, 50: black acrylic board
31, 41: anti-reflection film
32, 42: HC-TAC film
34, 44: adhesive paste
35: liquid crystal display
36, 53: HC layer
37, 57: mixed layer
38, 52: TAC film
51: adhesive paste layer
55: AR layer
218: resin solids content
318: structure

The invention claimed is:

1. An anti-reflection film comprising:
a substrate and a resin layer on the substrate,
the resin layer containing a plurality of cavities,
the resin layer and the substrate having refractive indexes that are different from each other by 0.001 to 0.2,
the resin layer including a base portion and a plurality of protrusions on the base portion,
the plurality of protrusions being integrally formed with the base portion,
the base portion having a thickness that varies at least in one direction in a region,
the film further comprising a body that is different from the resin layer and the substrate,
Newton rings being generated by synthetic waves of light reflected on an interface between air and the resin layer and an interface between the resin layer and the substrate,
the body being in contact with the resin layer and present at the center of the Newton rings,
the thickness of the base portion being greater at a site farther from the body within a region including the body, wherein
the region where the thickness of the base portion is greater at a site farther from the body does not have another body that is different from the resin layer and the substrate and in contact with the resin layer.

2. The anti-reflection film according to claim 1, wherein the body comprises foreign matter.

3. The anti-reflection film according to claim 1, wherein the body comprises a structure.

4. The anti-reflection film according to claim 1, wherein the substrate includes at least one of a concave portion and a convex portion on its surface.

5. A display device comprising the anti-reflection film according to claim 1.

6. The anti-reflection film according to claim 1, further comprising a moth-eye structure including the plurality of protrusions on a surface of the resin layer, wherein a pitch of the plurality of protrusions is not longer than a visible light wavelength.

* * * * *